(12) United States Patent
Athreya et al.

(10) Patent No.: US 7,406,617 B1
(45) Date of Patent: Jul. 29, 2008

(54) UNIVERSAL MULTI-PATH DRIVER FOR STORAGE SYSTEMS INCLUDING AN EXTERNAL BOOT DEVICE WITH FAILOVER AND FAILBACK CAPABILITIES

(75) Inventors: Giridhar Athreya, Lake Forest, CA (US); Juan Carlos Ortiz, Dana Point, CA (US)

(73) Assignee: Unisys Corporation, Blue Bell, PA (US)

( * ) Notice: Subject to any disclaimer, the term of this patent is extended or adjusted under 35 U.S.C. 154(b) by 682 days.

(21) Appl. No.: 10/996,271

(22) Filed: Nov. 22, 2004

(51) Int. Cl.
*G06F 11/00* (2006.01)
*G06F 15/173* (2006.01)

(52) U.S. Cl. ................. 714/4; 714/43; 709/239
(58) Field of Classification Search ............ 714/4, 714/5, 7, 8, 18, 43; 709/226, 239
See application file for complete search history.

(56) References Cited

U.S. PATENT DOCUMENTS

| | | | |
|---|---|---|---|
| 5,119,488 A * | 6/1992 | Takamatsu et al. | 714/4 |
| 5,732,269 A * | 3/1998 | Compton et al. | 719/310 |
| 5,758,055 A * | 5/1998 | Ono | 714/7 |
| 5,944,838 A * | 8/1999 | Jantz | 714/6 |
| 5,987,621 A * | 11/1999 | Duso et al. | 714/4 |
| 6,298,451 B1 * | 10/2001 | Lin | 714/4 |
| 6,802,021 B1 * | 10/2004 | Cheng et al. | 714/4 |
| 6,804,703 B1 * | 10/2004 | Allen et al. | 709/216 |
| 6,823,477 B1 * | 11/2004 | Cheng et al. | 714/26 |
| 6,857,026 B1 * | 2/2005 | Cain | 709/239 |
| 6,883,108 B2 * | 4/2005 | Lee et al. | 714/4 |
| 6,904,477 B2 * | 6/2005 | Padmanabhan et al. | 710/74 |
| 6,909,695 B2 * | 6/2005 | Lee et al. | 370/238 |
| 6,952,792 B2 * | 10/2005 | Emberty et al. | 714/5 |
| 7,003,687 B2 * | 2/2006 | Matsunami et al. | 714/4 |
| 7,222,348 B1 * | 5/2007 | Athreya et al. | 719/321 |
| 7,269,134 B2 * | 9/2007 | Soga | 370/225 |
| 2003/0172331 A1 * | 9/2003 | Cherian et al. | 714/712 |
| 2003/0200477 A1 * | 10/2003 | Ayres | 714/2 |
| 2004/0107300 A1 * | 6/2004 | Padmanabhan et al. | 710/1 |
| 2005/0091441 A1 * | 4/2005 | Qi et al. | 711/5 |

* cited by examiner

*Primary Examiner*—Joshua A Lohn
(74) *Attorney, Agent, or Firm*—Phuong-Quan Hoang; Robert P. Marley; Charles A. Johnson

(57) ABSTRACT

An embodiment of the invention is a technique for monitoring via a universal multipath driver (UMD) a first path to one of a plurality of virtual device objects. The virtual device objects are created by the UMD and correspond to a plurality of functional device objects. The functional device objects are created by a plurality of lower level drivers and correspond to a plurality of real physical devices having M device types including an external boot device. The UMD is a functional driver of each of the functional device objects. The lower level drivers control the real physical devices. The UMD detects a failure of the first path to a first virtual device object corresponding to a first real physical device and performs one of failover and failback for the first real physical device.

36 Claims, 18 Drawing Sheets

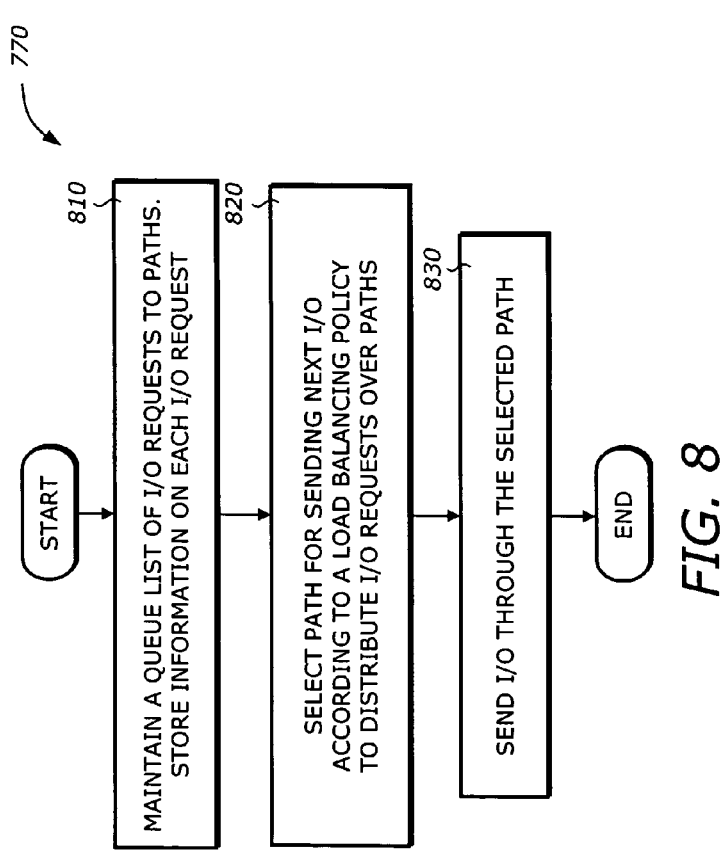
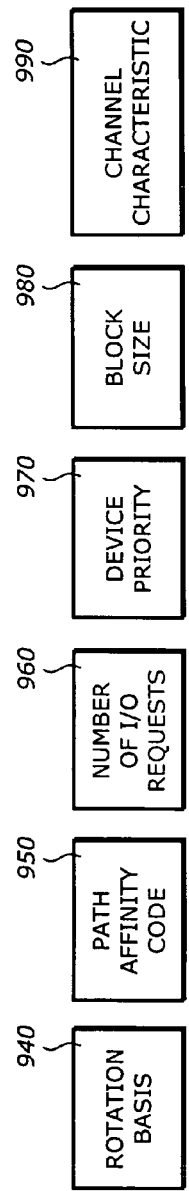
FIG. 8
FIG. 9

UNIVERSAL MULTI-PATH DRIVER FOR STORAGE SYSTEMS INCLUDING AN EXTERNAL BOOT DEVICE WITH FAILOVER AND FAILBACK CAPABILITIES

CROSS REFERENCE TO RELATED APPLICATIONS

This application is related to patent application Ser. No. 10/966,270 entitled "UNIVERSAL MULTI-PATH DRIVER FOR STORAGE SYSTEMS WITH MULTI-PATH ACCESS TO AN EXTERNAL BOOT DEVICE", filed on the same date and assigned to the same assignee as the present application, the contents of which are herein incorporated by reference.

This application is also related to the following patent applications: Ser. No. 10/321,029 entitled "UNIVERSAL MULTI-PATH DRIVER FOR STORAGE DEVICES"; Ser. No. 10/320,962 entitled "FAILOVER AND FAILBACK USING A UNIVERSAL MULTI-PATH DRIVER FOR STORAGE DEVICES"; Ser. No. 10/320,963 entitled "LOAD BALANCING IN A UNIVERSAL MULTI-PATH DRIVER FOR STORAGE DEVICES", filed on Dec. 16, 2002 and assigned to the same assignee as the present application.

BACKGROUND

1. Field of the Invention

Embodiments of the invention relates generally to drivers for storage systems, and more specifically, to multipath drivers for storage systems that include an external boot device.

2. Description of Related Art

Storage technology is important for systems that run data intensive applications. Currently, there are various storage devices having different capacities and streaming rates to accommodate various applications. Examples of these storage devices include redundant array of independent disks (RAIDs), tape drives, disk drives, and tape libraries. These devices may be connected to a system using various techniques such as the direct-attached storage technique, or storage area networks (SANs) (switch environment technique).

Existing multipath drivers to interface with these storage devices have a number of drawbacks. First, they do not provide a common driver for managing different types of devices. In other words, they are not universal. A system typically has to install several different types of drivers, one for each type of storage device. This creates complexity in management and system administration, increases cost in software acquisition and maintenance, and reduces system reliability and re-configurability. Second, existing techniques do not provide failover (and failback) for and among different storage devices, reducing system fault-tolerance and increasing server downtime. Third, they do not provide load balancing among different storage devices, causing performance degradation when there is skew in storage utilization.

SUMMARY OF THE INVENTION

An embodiment of the invention is a technique for monitoring via a universal multipath driver (UMD) a first path to one of a plurality of virtual device objects. The virtual device objects are created by the UMD and correspond to a plurality of functional device objects. The functional device objects are created by a plurality of lower level drivers and correspond to a plurality of real physical devices having M device types including an external boot device. The UMD is a functional driver of each of the functional device objects. The lower level drivers control the real physical devices. The UMD detects a failure of the first path to a first virtual device object corresponding to a first real physical device and performs one of failover and failback for the first real physical device.

BRIEF DESCRIPTION OF THE DRAWINGS

The invention may best be understood by referring to the following description and accompanying drawings that are used to illustrate embodiments of the invention. In the drawings:

FIG. 8 is a flowchart illustrating the process 770 to balance load according to one embodiment of the invention.

FIG. 9 shows the criteria that may be used by the process 770 in block 820 in selecting a path to send I/O in order to balance the load of I/O requests.

DESCRIPTION

An embodiment of the invention is a technique for monitoring via a universal multipath driver (UMD) a first path to one of a plurality of virtual device objects. The virtual device objects are created by the UMD and correspond to a plurality of functional device objects. The functional device objects are created by a plurality of lower level drivers and correspond to a plurality of real physical devices having M device types including an external boot device. The UMD is a functional driver of each of the functional device objects. The lower level drivers control the real physical devices. The UMD detects a failure of the first path to a first virtual device object corresponding to a first real physical device and performs one of failover and failback for the first real physical device.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
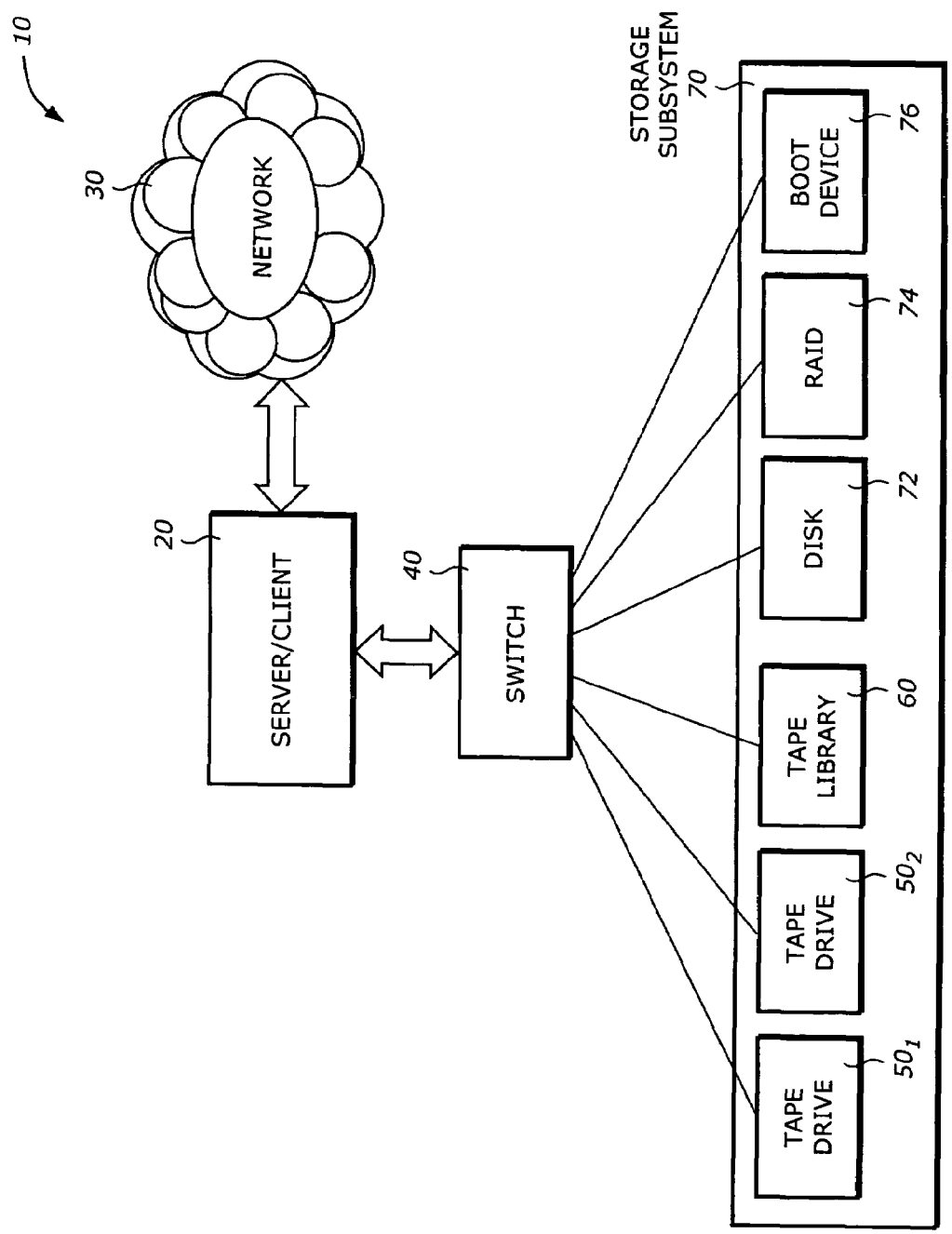
FIG. 1A is a diagram illustrating a system 10 in which one embodiment of the invention can be practiced.

FIG. 1A is a diagram illustrating a system 10 in which one embodiment of the invention can be practiced. The system 10 includes a server/client 20, a network 30, a switch 40, a storage subsystem 70. The storage subsystem 70 includes tape drives $50_1$ and $50_2$, a tape library 60, a disk subsystem 72, a redundant array of inexpensive disks (RAID) subsystem 74, and a boot device 76. Note that the system 10 is shown for illustrative purposes only. The system 10 may contain more or less components as show. The system 10 may be used in a direct attached storage or storage area networks (SAN). The topology of the system 10 may be arbitrated loop or switched fabric.

The server/client 20 is a computer system typically used in an enterprise environment. It may be a server that performs dedicated functions such as a Web server, an electronic mail (e-mail) server, or a client in a networked environment with connection to other clients or servers. The server/client 20 usually requires large storage capacity for its computing needs. It may be used in a wide variety of applications such as finance, scientific researches, multimedia, academic and government work, databases, entertainment, etc.

The network 30 is any network that connects the server/client 20 to other servers/clients or systems. The network 30 may be a local area network (LAN), a wide area network (WAN), an intranet, an Internet, or any other types of network. The network 30 may contain a number of network devices (not shown) such as gateways, adapters, routers, etc. to interface to a number of telecommunication networks such as Asynchronous Transfer Mode (ATM) or Synchronous Optical Network (SONET).

The switch 40 is an interconnecting device that interconnects the server/client 20 to various storage devices or other devices or subsystems. The switch 40 may be a hub, a switching hub, a multiple point-to-point switch, or a director, etc. It typically has a large number of ports ranging from a few ports to hundreds of ports. The complexity may range from a simple arbitrated loop to highly available point-to-point. The throughput of the switch 40 may range from 200 MegaByte per second (MBps) to 2 GBytes per second (GBps).

The tape drives $50_1$ and $50_2$ are storage devices with high capacity for backup and archival tasks. The capacity for a tape used in the tape drives may range from tens to hundreds of Gigabytes (GB). The transfer rates may range from 10 to 50 MBps. The tape library 60 includes multiple tape drives with automated tape loading. The capacity of the tape library 60 may range from 1 to 1,000 Terabytes (TB) with an aggregate data rate of 50-300 MBps. The tape drives $50_1$ and $50_2$ and tape library 60 use sequential accesses. The disk subsystem 72 may be a single drive or an array of disks. The RAID subsystem 74 is an array of disks with additional complexity and features to increase manageability, performance, capacity, reliability, and availability. The boot device 76 may be any disk device, and may also be included in the RAID subsystem 74.

The tape drives $50_1$ and $50_2$, tape library 60, disk subsystem 72, redundant array of inexpensive disks (RAID) subsystem 74, and boot device 76 form real physical devices that are attached to the server/client 20 to provide archival storage. These devices typically include different device types. The server/client 20 has ability to interface with all of these device types (e.g., tape drives, tape library, disk, RAID, boot device) using multiple paths.

Figure 1B:
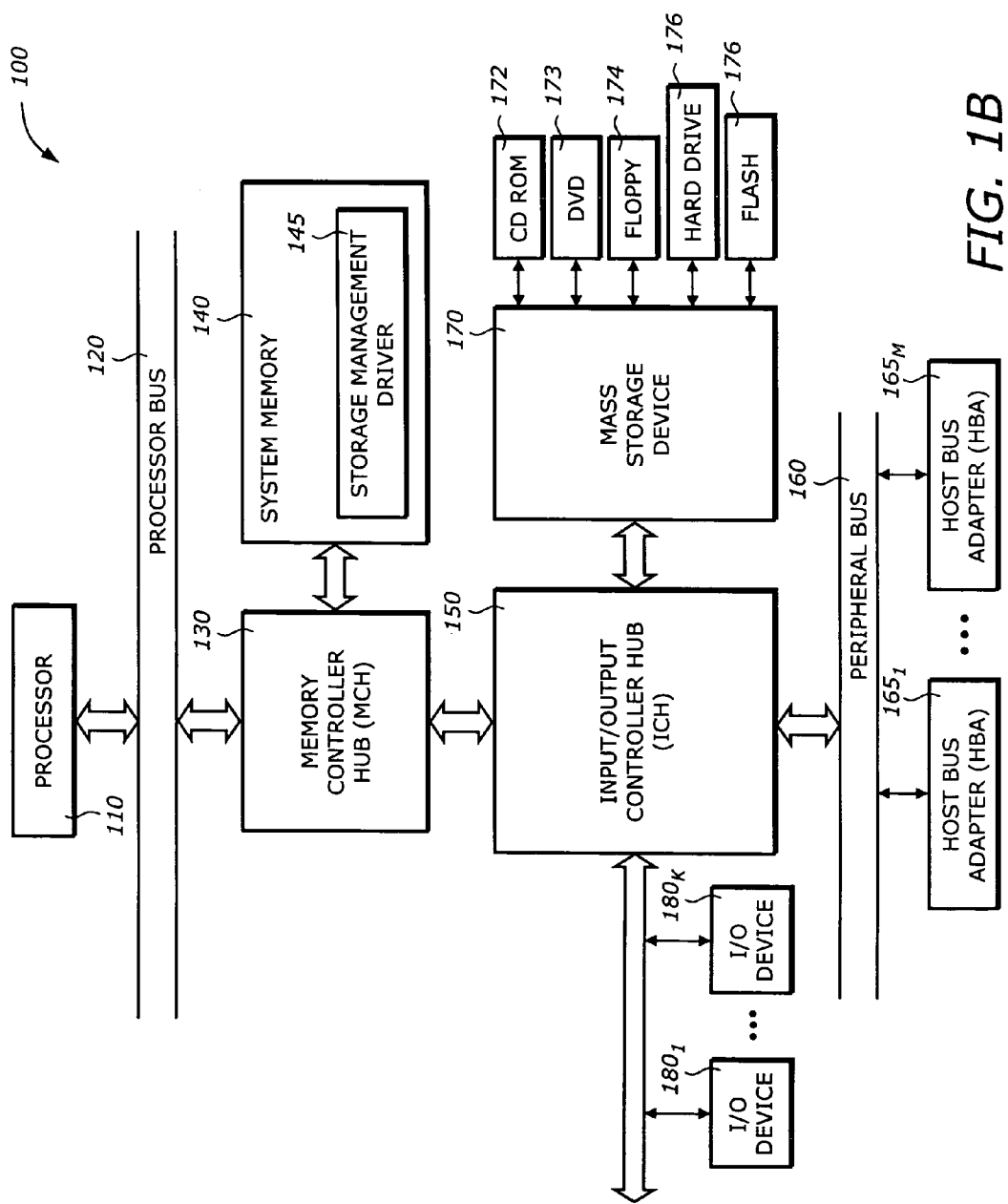
FIG. 1B is a diagram illustrating a server/client system 20 in which one embodiment of the invention can be practiced.

FIG. 1B is a diagram illustrating a server/client system 20 in which one embodiment of the invention can be practiced. The server/client system 20 includes a processor 110, a processor bus 120, a memory control hub (MCH) 130, a subsystem memory 140, an input/output control hub (ICH) 150, a peripheral bus 160, host bus adapters (HBAs) $165_1$ to $165_M$, a mass storage device 170, and input/output devices $180_1$ to $180_K$. Note that the server/client system 20 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140, the ICH 150. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. The system memory 140 includes a storage management driver 145. Any one of the elements of the storage management driver 145 may be implemented by hardware, software, firmware, microcode, or any combination thereof. The system memory 140 may also include other programs or data which are not shown, such as an operating system. The storage management driver 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The HBAs $165_1$ to $165_M$ are adapters that interface with the switch 40 (FIG. 1A). The HBAs $165_1$ to $165_M$ are typically add-on cards that interface with the peripheral bus 160 or any other bus accessible to the processor 110. The HBAs may have their own processor with local memory or frame buffer to store temporary data. The protocols supported by the HBAs may be Small Computer Small Interface (SCSI), Internet Protocol (IP), and Fiber Channel (FC). The transfer rates may be hundreds of MBps with full duplex. The media may include copper and multi-mode optics.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described herein.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 2A:
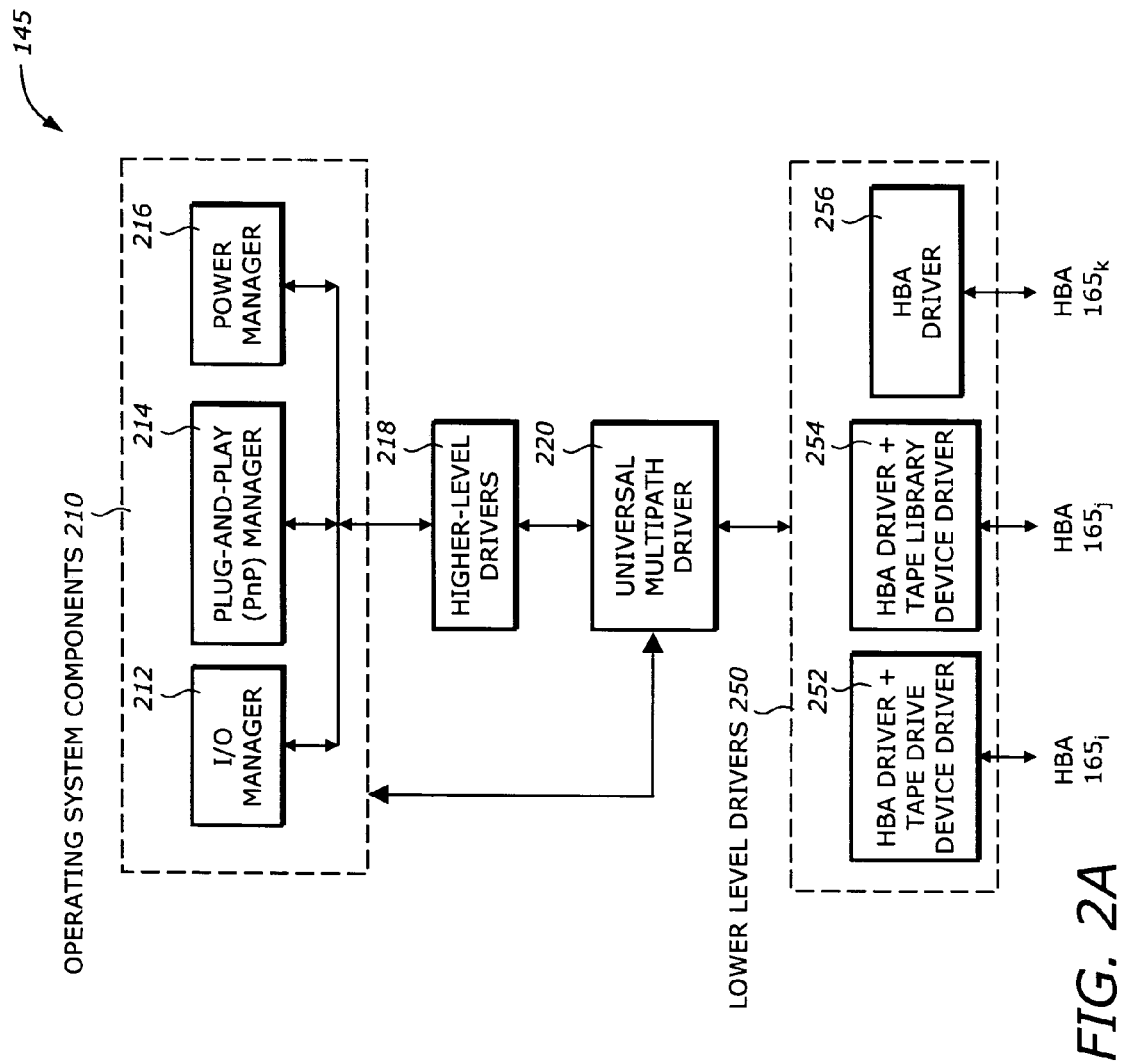
FIG. 2A is a diagram illustrating the storage management driver 145 according to one embodiment of the invention.

FIG. 2A is a diagram illustrating the storage management driver 145 according to one embodiment of the invention. The storage management driver 145 includes operating system components 210, higher-level drivers 218, a universal multi-path driver 220, and lower level drivers 250.

The OS components 210 include an I/O manager 212, a plug and play (PnP) manager 214, a power manager 216. The I/O manager 212 provides a consistent interface to all kernel-mode drivers. It defines a set of standard routines that other drivers can support. All I/O requests are from the I/O manager 212 sent as I/O request packets (IRPs). PnP manager 214 supports automatic installation and configuration of drivers when their corresponding devices are plugged into the system. The power manager 216 manages power usage of the system including power modes such as sleep, hibernation, or shutdown. The higher-level drivers 218 include a class driver and may also include any driver that interfaces directly with the OS components 210. In one embodiment, the I/O manager 212, the PnP manager 214, and the power manager 216 are from Microsoft Windows™ 2000, CE, and .NET.

The universal multipath driver (UMD) 220 is a driver that provides multipath management to the storage devices shown in FIG. 1A such as the tape drives, the tape library, the disk subsystem, the RAID subsystem, and the boot device. The UMD 220 responds to a call sent by the operating system components 210 or an IRP sent by the higher level driver 218, and interfaces with the lower level drivers 250.

The lower level drivers 250 include drivers that are directly responsible for the control and management of the real physical devices attached to the system. The lower level drivers 250 include a combination of HBA driver and tape drive device driver 252, a combination of HBA driver and tape library device driver 254, and a HBA driver 256 which are drivers for HBA $165_i$, HBA $165j$, and HBA $165_k$, respectively. The HBA $165_i$, HBA $165j$, and HBA $165_k$ in turn directly control the corresponding storage devices (tape drive, tape library, disk subsystem, RAID subsystem, Boot device) shown in FIG. 1A.

Figure 2B:
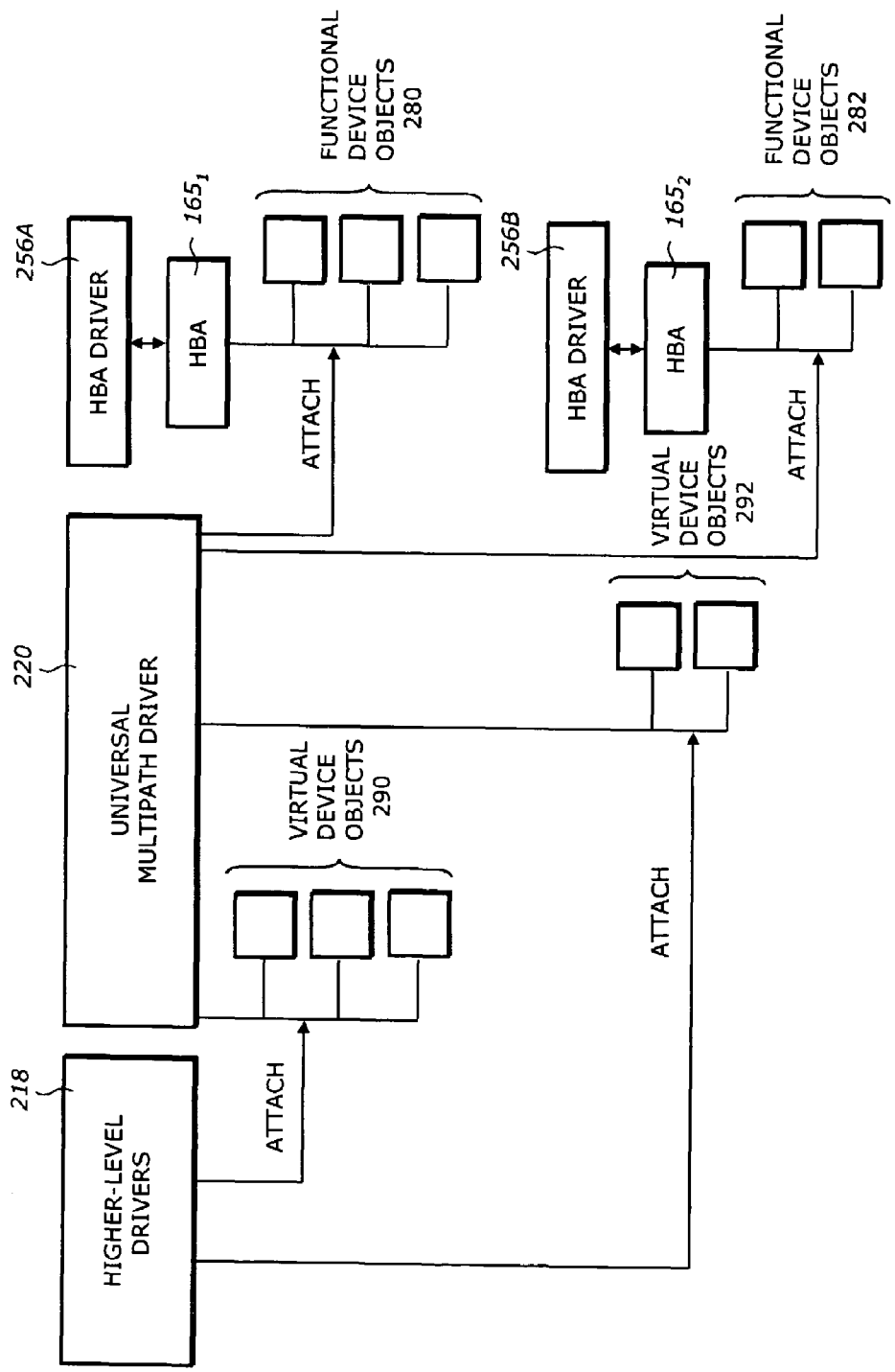
FIG. 2B is a diagram illustrating the action of the universal multipath driver (UMD) in response to the creation of devices by HBA drivers.

FIG. 2B is a diagram illustrating the action of the universal multipath driver (UMD) in response to the creation of devices by HBA drivers. HBA drivers 256A and 256B are the low level drivers that control the HBAs $165_1$ and $165_2$, respectively. When an HBA driver discovers that its corresponding HBA is connected to a real physical device, the HBA driver creates a device object corresponding to this real physical device. HBA driver 256A creates the three device objects 280. HBA driver 256B creates the two device objects 282. When a device object is created, it needs a functional driver in order to run. In the absence of the Universal Multipath Driver (UMD) of the present invention, the functional driver for any disk drive object is a high level driver that is dedicated to disk drive objects (such as disk.sys.driver in Microsoft Windows operating systems), and the functional driver for any tape drive object is a high level driver that is dedicated to tape drive objects (such as tape.sys in Microsoft Windows operating systems). In the system of the present invention, the UMD becomes the functional driver for the device objects created by the low level drivers by attaching to these device objects. For clarity of explanation, the device objects created by the low level drivers are herein referred to as "functional device objects". Upon being notified that the functional device objects 280 are created, the UMD attaches to the functional device objects 280 to act as their functional driver and creates the virtual device objects 290 to correspond to the functional device objects 280. Upon being notified that the virtual device objects 290 are created, the high level driver 294 attaches to the virtual device objects 290 to act as their functional driver. Similarly, upon being notified that the functional device objects 282 are created, the UMD attaches to the functional device objects 282 to act as their functional driver and creates the virtual device objects 292 to correspond to the functional device objects 282, then, upon being notified that the virtual device objects 292 are created, the high level driver 296 attaches to the virtual device objects 292 to act as their functional driver. All the virtual device objects are in a virtual device list maintained by the UMD. Each entry in the virtual device list points to a table that has all information about that entry, i.e., that virtual device object. This information includes the device code, the list of functional device objects that correspond to this virtual device object. Note that, under the terminology used by the Microsoft Windows operating system, a device object created by a driver is called a physical device object of that driver. This terminology will not be used herein so that the device objects created by the lower level drivers can be clearly distinguished from the device objects created by the UMD.

The UMD also maintains a list of real physical devices that can be supported.

The UMD re-enumerates the virtual device objects in the system to ensure that the system will only sees the virtual device objects in the correct amount of virtual device objects that the UMD wants the system to see, and not the functional device objects that the HBA drivers created. The UMD obtains information about the resources used by the lower level drivers by querying the lower level drivers for this information. The UMD maintains the information about each of the virtual device objects, such as its SCSI address, device name, device resources, whether the virtual device is a removable device, a pointer to the corresponding functional device object, and a list of paths to each of the virtual device objects. All this information allows the UMD to communicate with the corresponding lower level driver, and also allows the UMD to handle failures related to any of the functional device objects without relying on the lower level driver. In effect, the UMD becomes the software bus for the functional device objects created by the lower level drivers and, as such, is independent of the lower level drivers.

Figure 3:
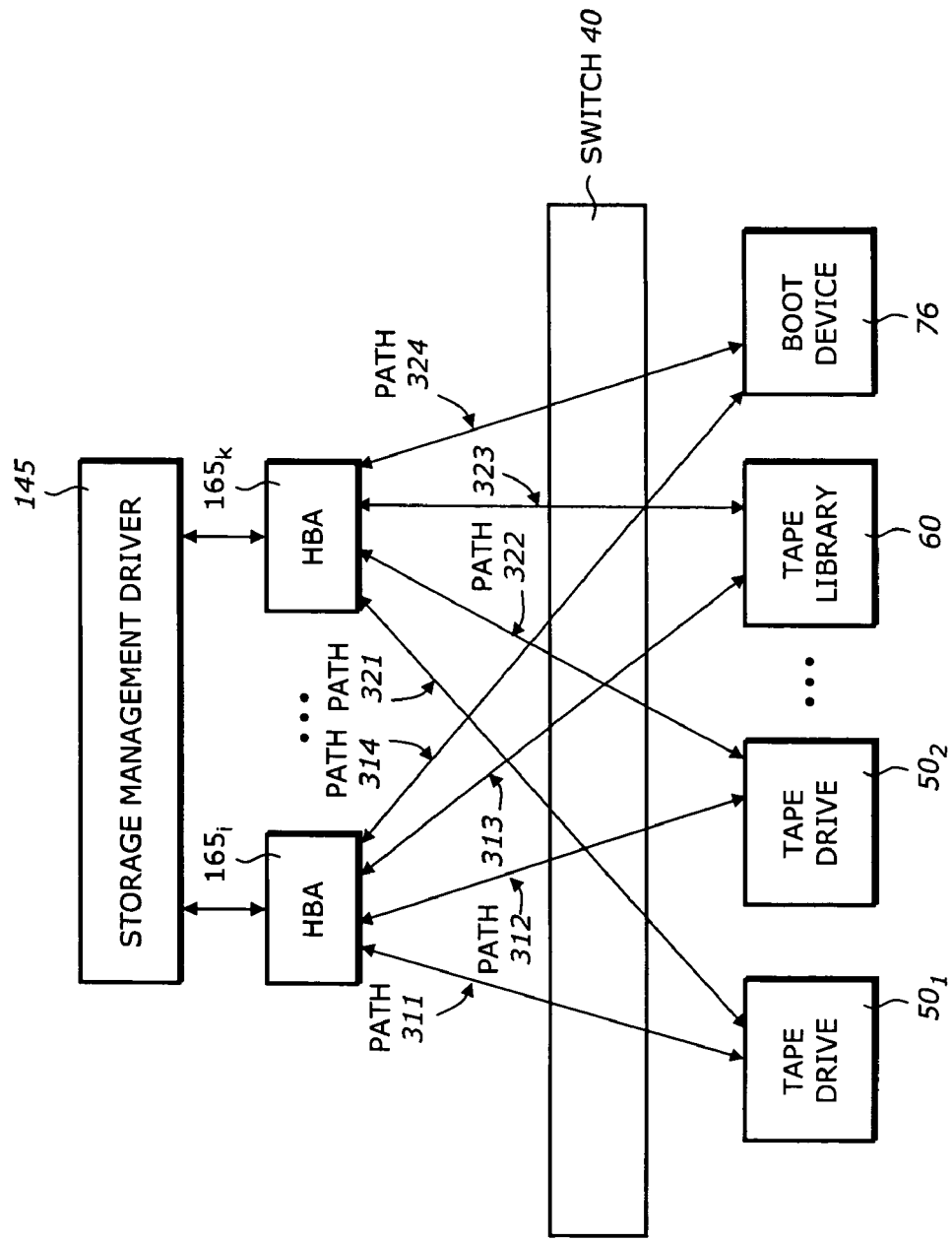
FIG. 3 is a diagram illustrating multipaths to real physical devices according to one embodiment of the invention.

FIG. 3 is a diagram illustrating multipaths to real physical devices according to one embodiment of the invention. A path is a physical connection between a HBA and the corresponding real device. Typically, an HBA is interfaced with a number of real devices via multiple paths through the switch 40. For example, the HBA $165_j$ is connected to the tape drives $50_1$ and $50_2$, the tape library 60, and the boot device 76 through the paths 311, 312, 313, and 314, respectively, and the HBA $165_k$ is connected to the tape drives $50_1$ and $50_2$, the tape library 60, and the boot device 76 through the paths 321, 322, 323, and 324, respectively.

The universal multipath driver (UMD) 220 provides multipath management, failover and failback, and load balancing. The UMD 220 maintains a list of virtual devices which correspond to the real devices that are connected to the system. The devices are identified by their device name, device identifier, and device serial number. This information is typically provided by the real peripheral devices upon inquiry by the corresponding lower level drivers.

Figure 4:
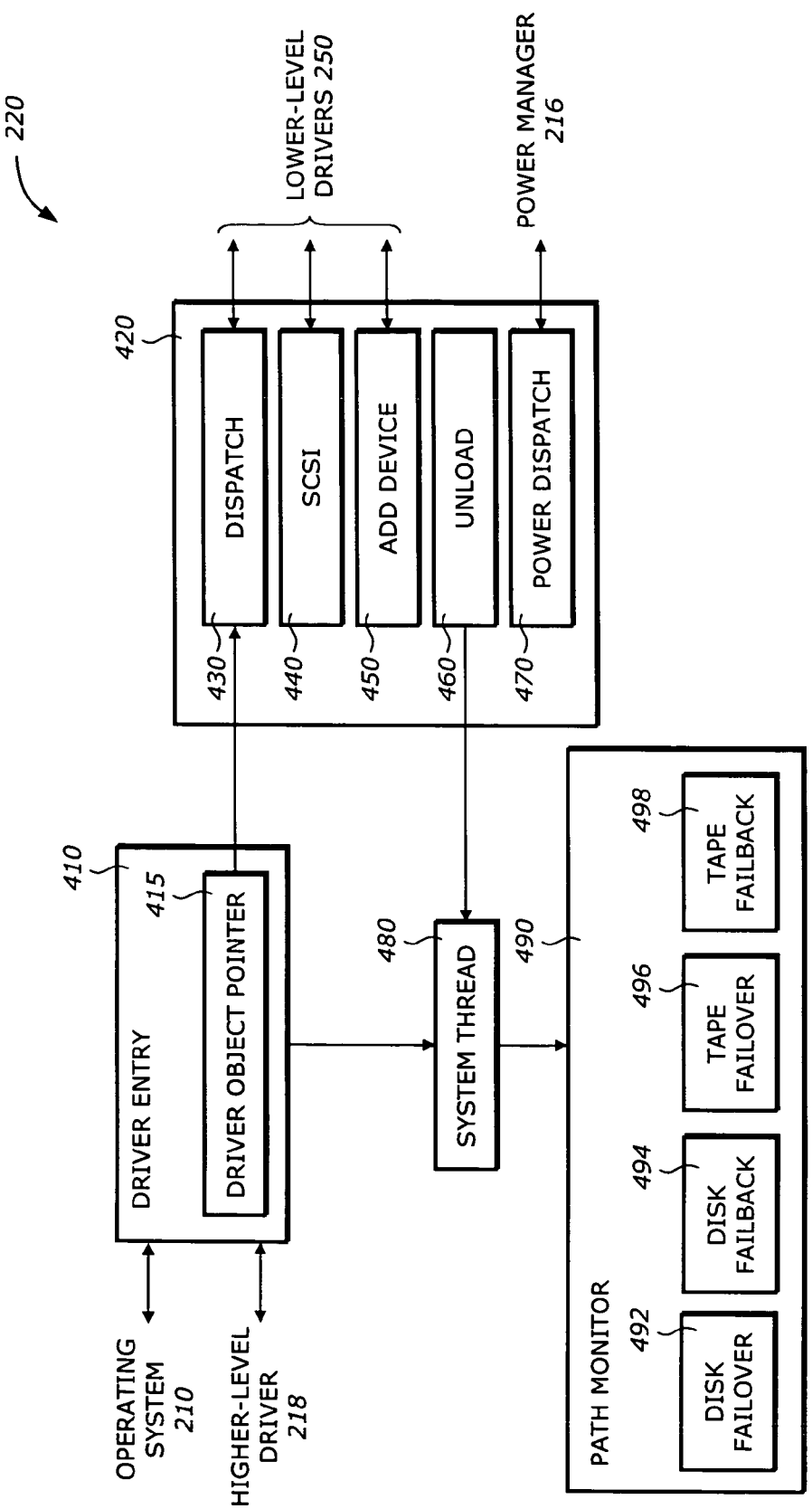
FIG. 4 is a diagram illustrating the universal multipath driver (UMD) 220 according to one embodiment of the invention.

FIG. 4 is a diagram illustrating the universal multipath driver (UMD) 220 according to one embodiment of the invention. The UMD 220 includes a driver entry 410, a major function group 420, a system thread 480, and a path monitor 490.

The driver entry 410 provides an entry point for the UMD 220 in response to a call from the operating system 210 or an IRP issued by the higher level driver 218. The driver entry 410 includes a driver object pointer 415 that provides address reference or points to the major function group 420. The driver entry 410 also causes creation of the system thread 480. The system thread 480 invokes the path monitor 490.

The major function group 420 includes a number of functions, routines, or modules that manage the multiple paths connected to the real physical devices. In one embodiment, these functions, modules, or routines are compatible with the Microsoft Developer Network (MSDN) library. The major function group 420 includes a Dispatch function 430, an SCSI function 440, an Add Device function 450, an Unload function 460, and a Power Dispatch function 470.

The Dispatch function 430, the SCSI function 440, and the Add Device function 450 interface with the lower level driver 250.

The Dispatch function 430 handles the IRPs received from the higher level drivers 218. In response to an IRP, the Dispatch function 430 dispatches operations corresponding to the IRP. In one embodiment, the PnP manager sends a major PnP IRP request during enumeration, resource rebalancing, and any other time that plug-and-play activity occurs on the system. The operations of the Dispatch function 430 are performed on both functional device objects created by the low level drivers and on the virtual device objects created by the UMD 220.

The SCSI function 440 is invoked in response to an IRP. The SCSI function 440 sets up IRPs with device- or device-specific I/O control codes, requesting support from the lower-level drivers. The operations of the SCSI function 440 are performed on both functional device objects created by the low level drivers and on the virtual device objects created by the UMD 220.

The Add Device function 450 is invoked in response to a call from the operating system 210, typically from the PnP 214. The Add Device function 450 handles creation and initialization of a device object. The Add Device function 450 applies to both functional or virtual device objects. The Add Device function 450 creates and initializes a new virtual device object for the corresponding functional device object, then attaches the functional device object to the device stack of the drivers for the functional device.

The Unload function 460 is invoked in response to a call from the operating system 210. The Unload function 460 applies to all the virtual device objects, that are not a boot device, created by the UMD 220. The Unload function 460 frees any objects and releases any driver-allocated resources. It terminates the system thread 480.

The Power Dispatch 470 is invoked in response to an IRP. It forwards IRPs that are related to power management to the lower level drivers which later forward the IRPs up the hierarchical chain to the power manager 216.

The path monitor 490 monitors the multiple paths in the system and determines if there is any failure. Path failure occurs when a peripheral device is no longer reachable via one of the paths. This may be a result of disconnection or any other malfunction or errors. When a path failure occurs, the failed path is placed into a bad path list. When a bad path becomes functional again, path failback can then be initiated. When failback is completed, the path is removed from the bad path list. When a path failure is detected, an alternate path to the same device or to an alternate device may be established for the failed path. This is called a failover. The alternate device may be in active status or passive status prior to the failover. The path monitor 490 includes a disk failover module 492 to handle failover for a disk drive, a disk failback module 494 to handle failback for a disk drive, a tape failover module 496 to handle failover for a tape drive, and a tape failback module 498 to handle failback for a tape drive.

Figure 5:
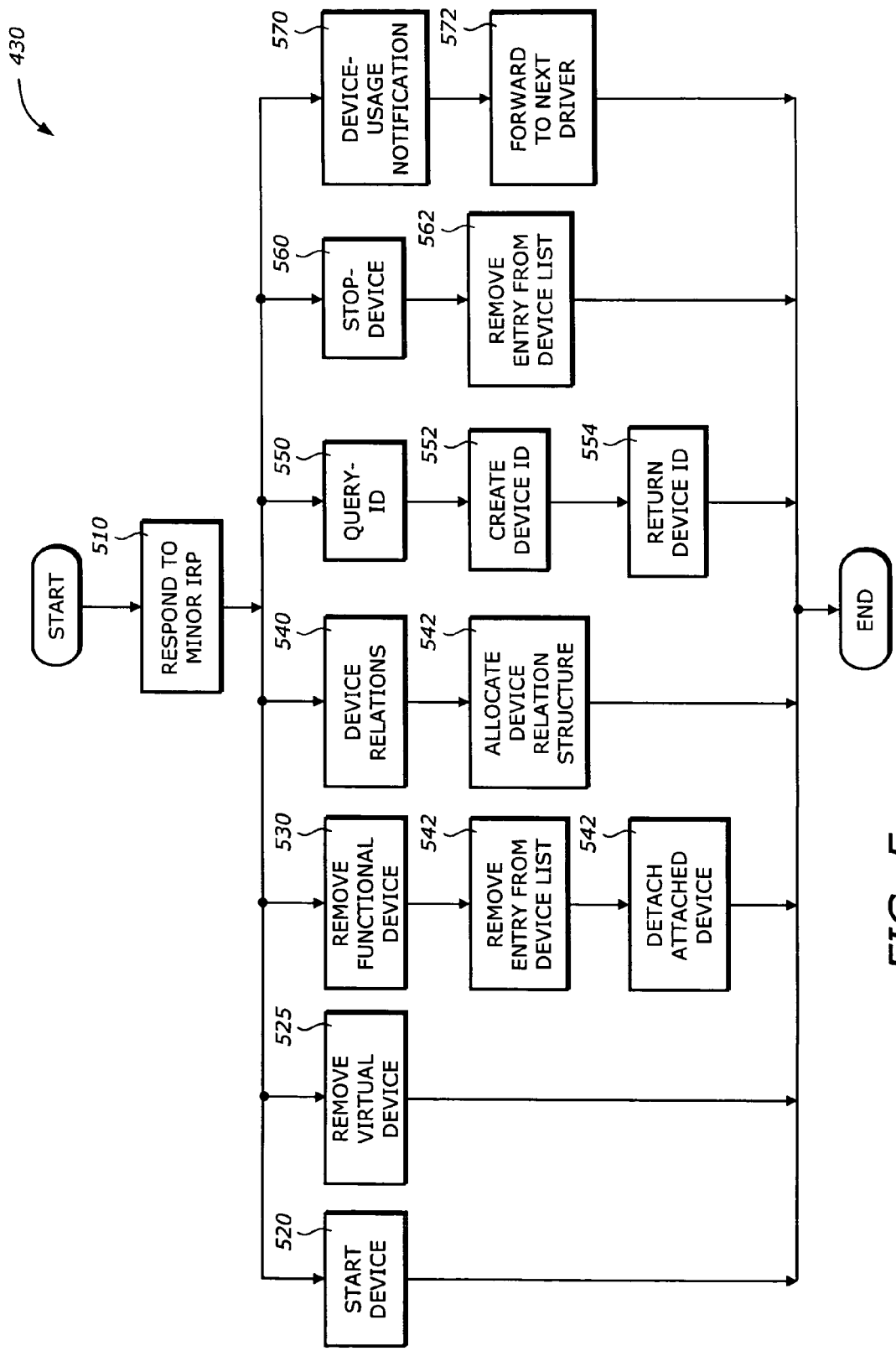
FIG. 5 is a flowchart illustrating the process 430 to dispatch according to one embodiment of the invention.

FIG. 5 is a flowchart illustrating the process 430 to dispatch according to one embodiment of the invention.

Upon START, the process 430 responds to a minor IRP (Block 510). A minor IRP may be a start device minor IRP (Block 520), a remove virtual device minor IRP (Block 530), a remove functional device minor IRP (Block 530), a device relation minor IRP (Block 540), a query ID minor IRP (Block 550), a stop device minor IRP (Block 560), and a device usage notification (Block 570). The process 430 determines the type of the received minor IRP and whether the minor IRP applies to a functional device object or a virtual device object, and performs operations in response to the minor IRP accordingly.

Figure 6:
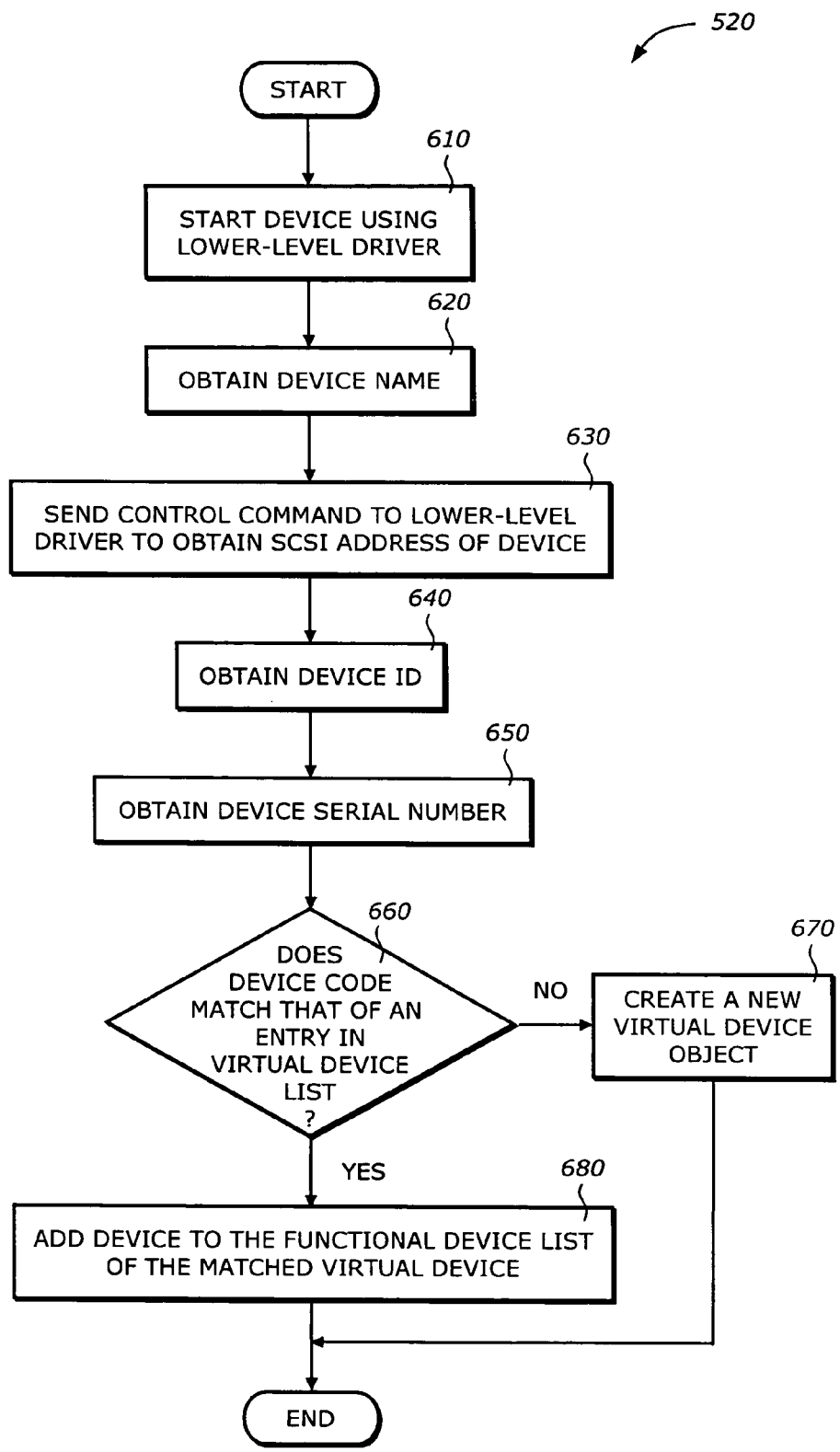
FIG. 6 is a flowchart illustrating the process 520 to respond to a start device minor IRP for a functional device object according to one embodiment of the invention.

The start device minor IRP (Block 520) may apply to a virtual device object or a functional device object. If the start device minor IRP is for a virtual device object, the process 430 just returns a success status and then is terminated. If the start device minor IRP is for a functional device object, the process 430 performs more operations. The details of the operations for the start device minor IRP in Block 520 for a functional device object are shown in FIG. 6.

Figure 12:
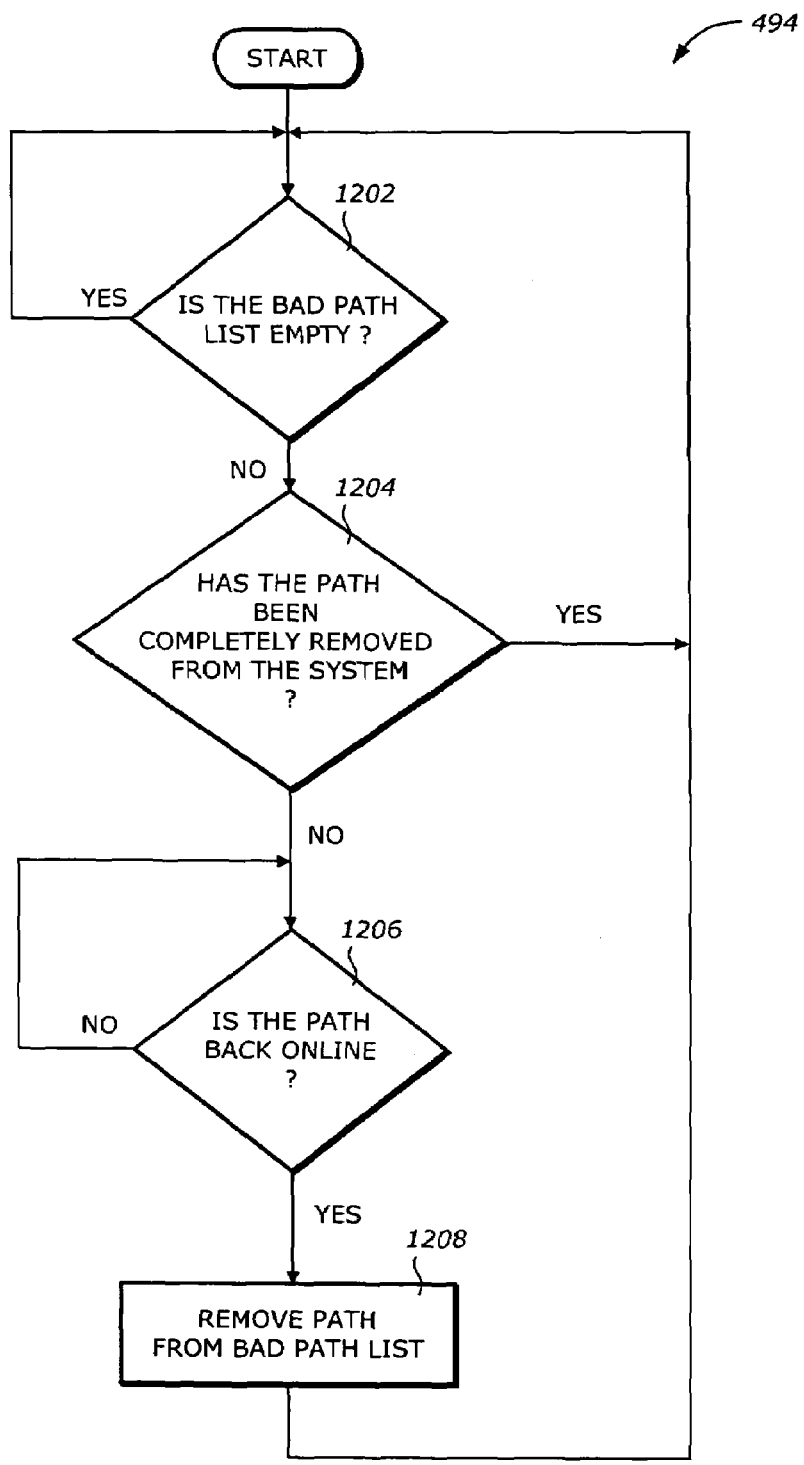
FIG. 12 is a flowchart illustrating the failback process for a disk drive 494 of the path monitor 490 (FIG. 4) according to an embodiment of the invention.

The remove virtual device minor IRP (block 525) may apply to virtual device objects. The details of operations for the start device minor IRP in Block 525 are shown in FIG. 12.

The remove device minor IRP (block 530) may apply to functional device objects. In response to the remove device minor IRP, the process 430 removes an entry from a device list (Block 532). This entry contains the device attributes such as name, serial number, and device ID. Next, the process 430 detaches the attached device (Block 534). This can be performed by sending a command to the lower level driver that is responsible for controlling the attached device. The process 430 is then terminated.

The device relations minor IRP (Block 540) may apply to both virtual device objects and functional device objects. In response to the device relations minor IRP, the process 430 allocates a device relation structure in a page memory (Block 542) and is then terminated.

The query id minor IRP (Block 540) may apply to both virtual device objects and functional device objects. In response to the query id minor IRP, the process 430 creates a device ID (Block 552), returns the device ID (Block 554) and is then terminated.

The stop device minor IRP (Block 560) may apply to virtual device objects except for the virtual device object that corresponds to a boot device. In response to the stop device minor IRP, the process 430 removes an entry from the virtual device list (Block 562) and is then terminated.

The device usage notification minor IRP (Block 570) may apply to both virtual device objects and functional device objects. If the device usage notification minor IRP (Block 570) is for a virtual device object, the process 430 just returns and is terminated. If the device usage notification minor IRP (Block 570) is for a functional device object, the process 430 forwards the IRP to the next driver in the stack (Block 572) and is then terminated.

FIG. 6 is a flowchart illustrating the process 520 to respond to a start device minor IRP for a functional device object according to one embodiment of the invention.

Upon START, the process 520 starts the device that corresponds to the functional device object using the lower level driver (Block 610). This may be performed by sending a command to the lower level driver that directly controls the real device, or by writing control parameters to the appropriate calling function. Next, the process 520 obtains the device name (Block 620). Then, the process 520 sends control command to the lower level driver to obtain the SCSI address of the device (Block 630). Next, the process 520 obtains the device identifier (ID) (Block 640). Then, the process 520 obtains the device serial number (Block 650). Next, the process 520 determines if the device code of this device matches the device code of an existing virtual device object in the list of virtual device objects (Block 660). The device code may be any one of the device ID or the device serial number or both. If the device code of this device matches the device code of an existing virtual device object, the process 520 adds the device to the list of functional device objects of that existing virtual device object (Block 680) then is terminated. Otherwise, the process 520 creates a new virtual device object corresponding to the device and adds the device to the list of functional device objects of the newly created virtual device object (Block 670) and then is terminated.

Figure 7:
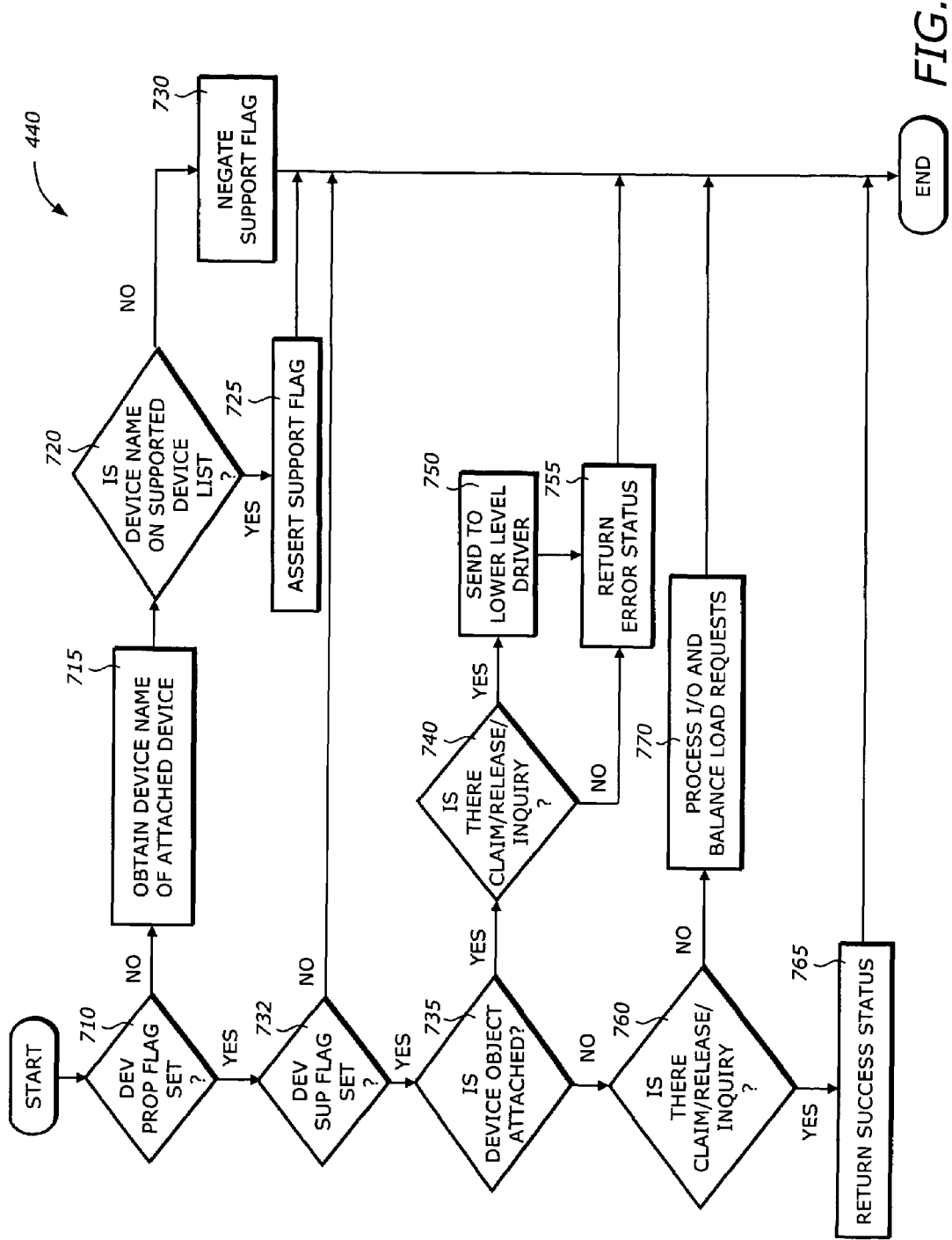
FIG. 7 is a flowchart illustrating the SCSI function 440 (FIG. 4) in response to a SCSI IRP according to one embodiment of the invention.

FIG. 7 is a flowchart illustrating the SCSI function 440 (FIG. 4) in response to a SCSI IRP according to one embodiment of the invention.

Upon START, the process 440 determines whether the device property flag for this device is set, indicating that the device property has been obtained (Block 710). If it is not set, the process 440 obtains the device name of the attached device (Block 715). Then, the process 440 determines if the device name is on the functional device list of the corresponding virtual device (Block 720). If so, the process 440 asserts the device support flag and is then terminated. Otherwise, the process 440 negates the device support flag (Block 730) and is then terminated.

At Block 710, if the device property flag is set, the process 440 determines if the device support flag is set (Block 732). If it is not set, process 440 is terminated. Otherwise, process 440 determines whether the device object is attached (Block 735). If the device object is attached (meaning that the device object that is the subject of the SCSI IRP is a functional device object), the process 440 determines if the SCSI IRP is for a claim, or a release, or an inquiry (Block 740). If the SCSI IRP is for a claim, or a release, or an inquiry, the process 440 sends the SCSI IRP to a next driver (Block 750) then returns an error status (Block 755) and is then terminated. If the SCSI IRP is not for a claim, or a release, or an inquiry, the process 440 returns an error status (Block 755) and is then terminated. Note that, from the preceding description, if the subject of the SCSI IRP is a functional device object, process 440 returns an error status because, with the UMD in the system, all SCSI requests must be for a virtual device object and not for a functional device object. Before returning an error status, process 440 checks whether the SCSI IRP is for a claim, release, or inquiry, in order to satisfy the requirements of some operating systems such as Microsoft Windows.

If the device object is not attached, meaning that subject of the SCSI IRP is a virtual device object, the process 440 determines if the SCSI IRP is for a claim, a release, or an inquiry (Block 760). If the SCSI IRP is not for a claim, a release, or an inquiry, meaning that the IRP is just for I/O requests, the process 440 processes the I/O requests or balance the load (Block 770) and is then terminated. Otherwise, the process 440 returns a success status (Block 765) and is then terminated. The details of the Block 770 are shown in FIG. 8.

FIG. 8 is a flowchart illustrating the process 770 to balance load according to one embodiment of the invention.

Figure 10:
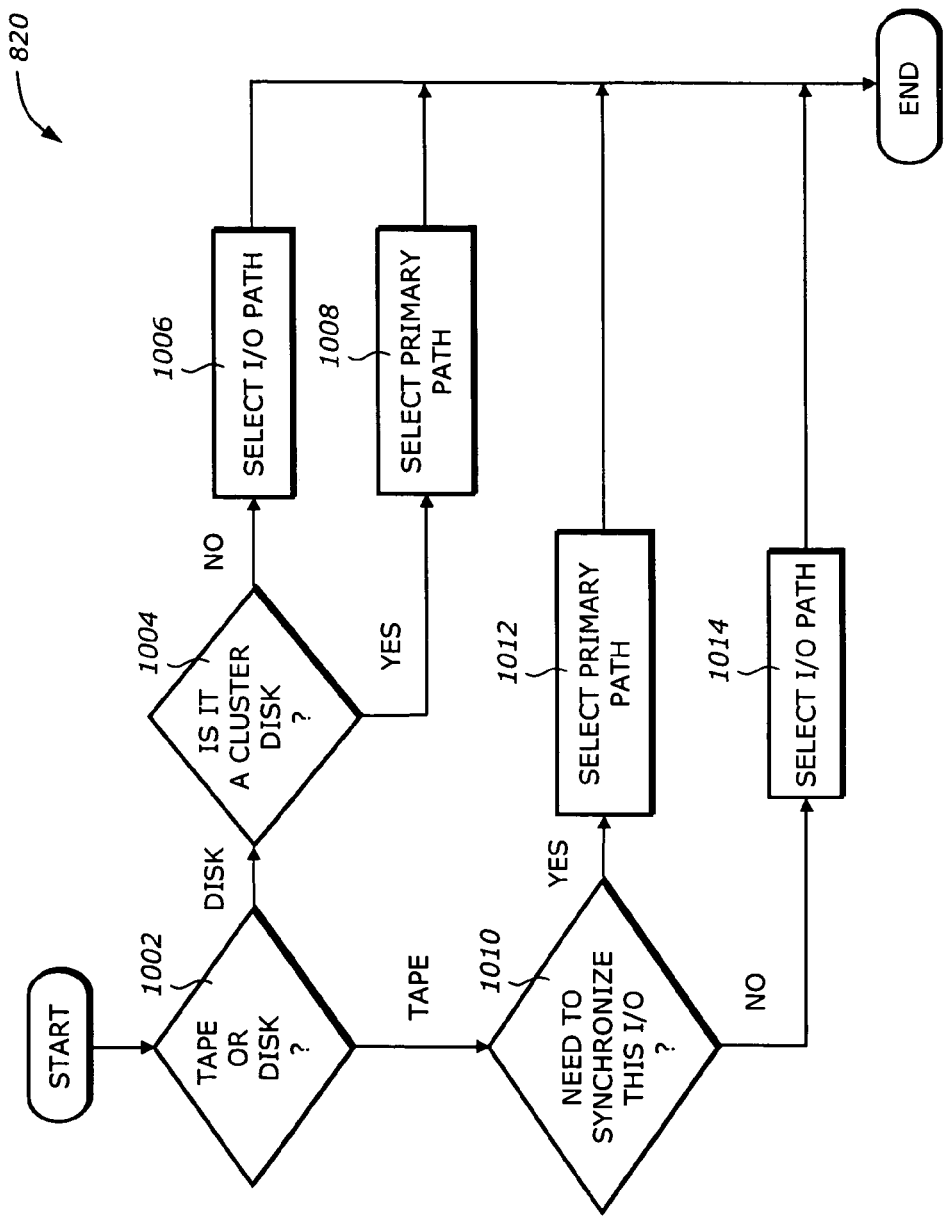
FIG. 10 is a flowchart illustrating the process 820 of process 770 to select a path for sending I/O to a device in order to balance load, according to one embodiment of the invention.

Upon START, the process 770 maintains a queue list of I/O requests to the paths (Block 810). This can be done by storing information on each of the I/O requests in the queue list. The information may include a pointer or an address reference to the device object, a device priority, a path affinity code, a number of I/O requests for a path, or a channel characteristic. The channel characteristic may includes the channel speed or transfer rate, the channel capacity, etc. Then, the process 770 distributes the I/O requests over the paths to balance the load according to a balancing policy (Block 820). This can be done by selecting a next path in the queue list using at least one balancing criterion. A number of balancing criteria or policies can be used. The balancing criteria used in one embodiment are shown in FIG. 9. Details of Block 820 is shown in FIG. 10. After selecting a path (Block 820), process 770 sends the I/O through the selected path (Block 830) and is then terminated.

FIG. 9 shows the criteria that may be used by the process 770 in block 820 in selecting a path to send I/O in order to balance the load of I/O requests. In a round robin policy, the process 770 selects the next path on a rotation basis (Block 940). This can be performed by moving the head of a queue back to the end and advance the queued requests up by one position. In a path affinity policy, the process 770 selects the next path according to the path affinity code (Block 950). The path affinity code indicates a degree of affinity of the next path with respect to the current path. In a request policy, the process 770 selects the next path according to the number of I/O requests assigned to that path (Block 960). Typically, the path having the least amount of I/O requests is selected. In a priority policy, the process 770 selects the next path according to the device priority (Block 970). The device priority may be determined in advance during initialization or configuration, or may be dynamically determined based on the nature of the I/O tasks. In a size policy, the process 770 selects the next path according to the block size of the I/O requests (Block 980). Typically, the path having the largest block size is selected. In a channel policy, the process 770 selects the next path according to the channel characteristic (Block 990). For example, the path having a channel with fast transfer rate may be selected.

FIG. 10 is a flowchart illustrating the process 820 of process 770 to select a path for sending I/O to a device in order to balance load, according to one embodiment of the invention. Upon Start, process 820 determines whether the device is a tape drive or a disk drive (Block 1002). If it is a disk drive, process 820 determines whether it is a cluster disk drive (Block 1004). If it is not a cluster disk drive, process 820 selects an I/O path according to at least one of the balancing criteria 940, 950, 960, 970, 980, 990 shown in FIG. 9 (Block 1006) and then is terminated. If the device is a cluster disk drive, process 820 selects a primary path according to at least one of the balancing criteria 950, 960, 970, 980, 990 shown in FIG. 9, but not the round robin criterion 940 (Block 1008) and then is terminated. If the device is a tape drive, process 820 checks whether this I/O request needs to be synchronized (Block 1010). If so, process 820 selects a primary path according to at least one of the balancing criteria 950, 960, 970, 980, 990 shown in FIG. 9, but not the round robin criterion 940 (Block 1008) and then is terminated. If the I/O request does not need to be synchronized, process 820 select an I/O path (Block 1014) and then is terminated.

Figure 11:
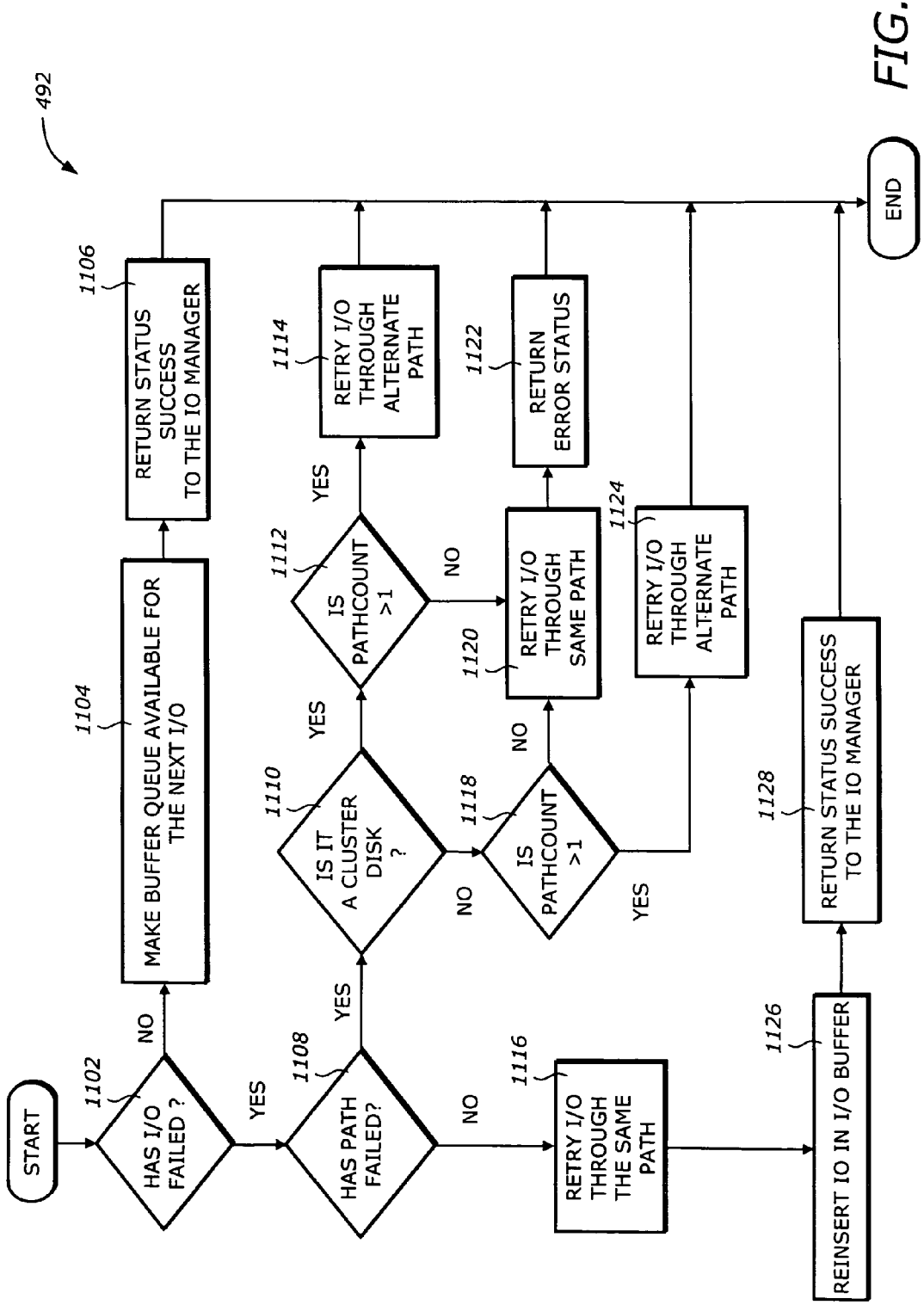
FIG. 11 is a flowchart illustrating the failover process for a disk drive 492 of the path monitor 490 (FIG. 4) according to an embodiment of the invention.

FIG. 11 is a flowchart illustrating the failover process for a disk drive 492 of the path monitor 490 (FIG. 4) according to an embodiment of the invention.

Upon START, the process 492 checks whether the I/O for the disk drive has failed (Block 1102). If the I/O has not failed, process 492 makes the buffer queue available for the next I/O (Block 1104), returns a success status to the I/O manager (Block 1106), then is terminated. If the I/O has failed, process 492 checks whether the I/O path has failed (block 1108). This can be performed by determining if the path is in a list of bad paths or paths having disconnected status.

If the path has failed, process 492 determines whether the device is a cluster disk drive (Block 1110). If the device is a cluster disk drive, process 492 checks whether the pathcount is strictly greater than 1 (Block 1112). If the pathcount is strictly greater than 1, process 492 retries sending I/O through an alternate path (Block 1114) then is terminated. If the path count is not strictly greater than 1, process 492 retries sending I/O through the same path (Block 1120), then returns an error status to the I/O manager (Block 1122) then is terminated. If the device is not a cluster disk drive, process 492 checks whether the pathcount is strictly greater than 1 (Block 1118). If the path count is not strictly greater than 1, process 492 retries sending I/O through the same path (Block 1120), then returns an error status to the I/O manager (Block 1122) then is terminated. If the pathcount is strictly greater than 1, process 492 retries sending I/O through an alternate path (Block 1124) then is terminated. Note that process 492 checks whether the device is a cluster disk drive because I/O to a cluster disk drive is handled differently from I/O to a non-cluster disk drive.

If the path has not failed, process 492 retries sending I/O through the same path (Block 1116). Process 492 reinserts I/O in the I/O buffer (Block 1126), returns a success status to the I/O manager (Block 1128), then is terminated.

FIG. 12 is a flowchart illustrating the failback process for a disk drive 494 of the path monitor 490 (FIG. 4) according to an embodiment of the invention.

Upon START, the process 494 checks whether the bad path list is empty (Block 1202). If it is empty, process 494 loops back to keep checking it. Otherwise, process 494 checks whether a bad path in the bad path list has been completely removed from the system (Block 1204). If it has been removed from the system, process 494 loops back to Block 1202 to continue monitoring by checking the bad path list. Otherwise, process 494 checks whether the path is back on line (Block 1206). This can be done by checking the status of the device, as returned by the lower-level driver or the OS driver, to see if the connection status is a connected status. A connected status indicates that the path is back on line. If the path is not back on line, process 494 loops back to Block 1206 to continue checking the connection status. If the path is back on line, process 494 removes the path from the bad path list (Block 1208), then loops back to block 1202 to continue monitoring the bad path list.

Figure 13:
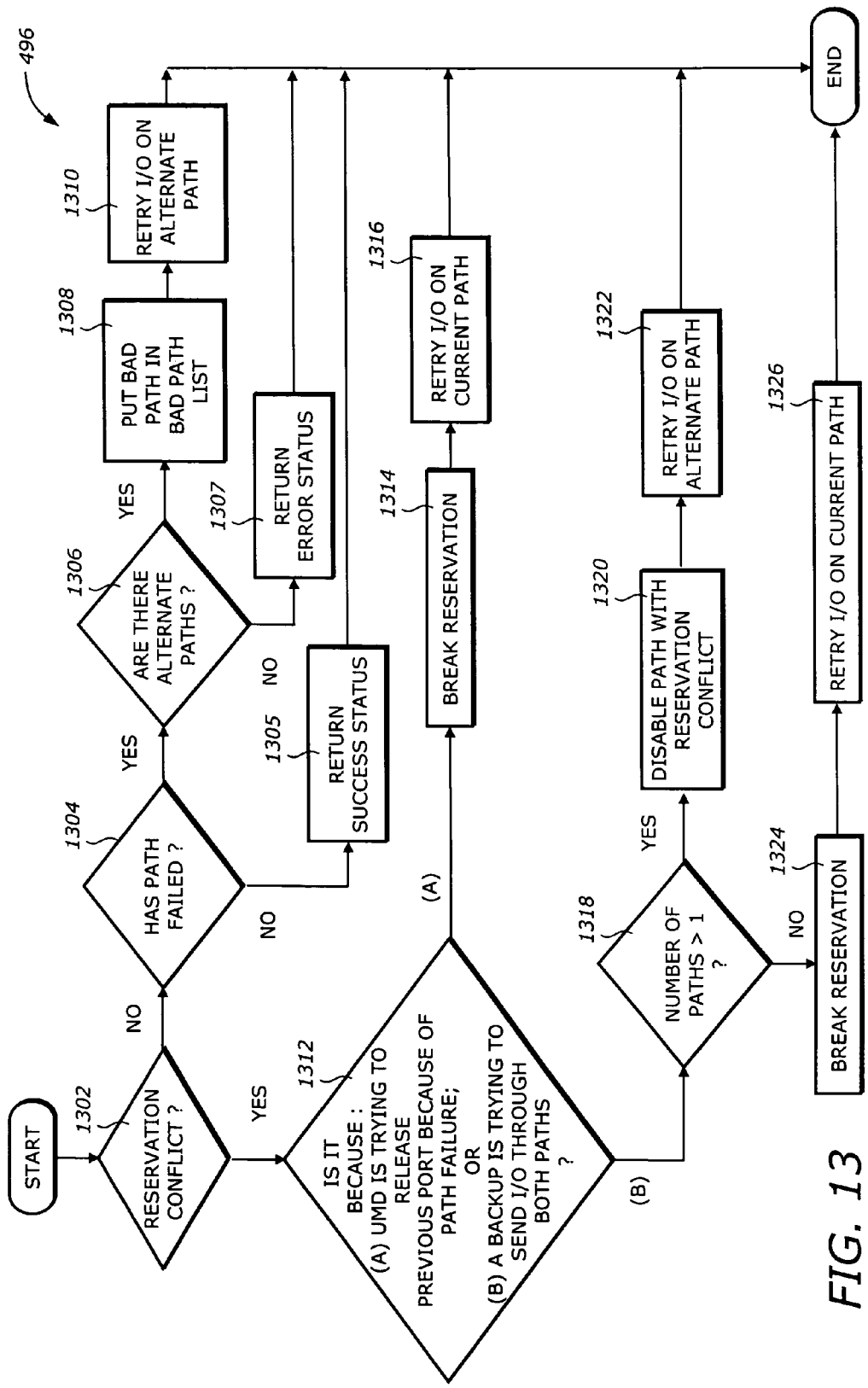
FIG. 13 is a flowchart illustrating the failover process for a tape drive 496 of the path monitor 490 (FIG. 4) according to an embodiment of the invention.

FIG. 13 is a flowchart illustrating the failover process for a tape drive 496 of the path monitor 490 (FIG. 4) according to an embodiment of the invention. Note that there may be more than one port to a tape device. When one port of the tape device fails, if the UNM tries to send I/O to the tape device through another port, this other port will return a Reservation Conflict for that I/O.

Upon Start, process 496 checks whether there is a Reservation Conflict (Block 1302). If there is no Reservation Conflict, process 496 checks whether the path through which the I/O was sent has failed (Block 1304). If the path has not failed, process 496 returns a success status (Block 1305) to the I/O manager then is terminated. If the path has failed, process 496 checks whether there are alternate paths (Block 1306). If there is no alternate path, process 496 returns an error status (Block 1307) to the I/O manager then is terminated. Otherwise, process 496 puts the bad path in the bad path list (Block 1308), then retries sending I/O on an alternate path (Block 1310), and then is terminated.

If there is a Reservation Conflict, process 496 determines whether the Reservation Conflict is received from this port of the tape device because (a) the UMD had tried to release a previous port due to failure of the path to the previous port (see the portion of process 496 that comprises Blocks 1304, 1306, 1308, 1310) or (b) because a backup is trying to send I/O through both paths (Block 1312). If the reason for the Reservation Conflict is (a), then process 496 breaks the reservation of this alternate path (Block 1314) and retries sending I/O on this alternate path (Block 1316), and then is terminated.

If the reason for the Reservation Conflict is (b), process 496 will readjust I/O distribution for this condition as follows. First, process 496 determines whether there are strictly more than one paths (Block 1318). If there are strictly more than one paths, process 496 disables the path that has the reservation conflict (Block 1320), then retries sending I/O on an alternate path (Block 1322), and then is terminated. If there is less than one path, process 496 breaks the reservation of the path that has the reservation conflict (Block 1324) then retries sending I/O on this path (Block 1326), and then is terminated.

Figure 14:
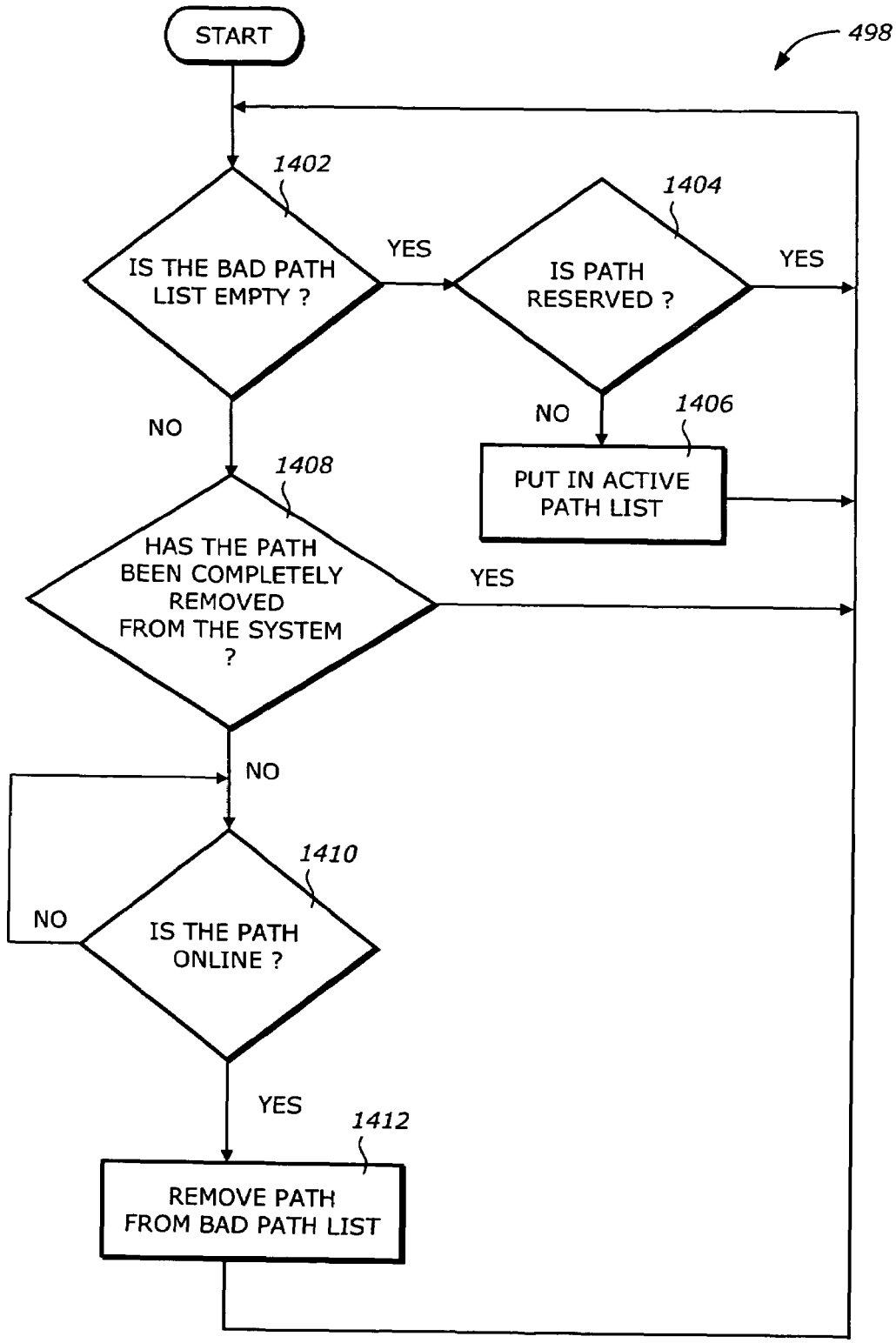
FIG. 14 is a flowchart illustrating the failback process for a tape drive 498 of the path monitor 490 (FIG. 4) according to an embodiment of the invention.

FIG. 14 is a flowchart illustrating the failback process for a tape drive 498 of the path monitor 490 (FIG. 4) according to an embodiment of the invention.

Upon Start, process 498 checks whether the bad path list is empty (Block 1402). If it is empty, process 498 checks whether the path to the tape drive is reserved (Block 1404). If the path is reserved, process 498 goes back to Block 1402 to continue monitoring. If the path is not reserved, process 498 includes the path in the active path list (Block 1406) then goes back to Block 1402 to continue monitoring.

At Block 1402, if the bad path list is not empty, process 498 determines whether the path in the bad path list has been completely removed from the system (Block 1408). If it has been completely removed, process 498 goes back to Block 1402 to continue monitoring. Otherwise, process 498 determines whether the path is back online (Block 1410). This can be done by checking the status of the device, as returned by the lower-level driver or the OS driver, to see if the connection status is a connected status. A connected status indicates that the path is back on line. If it is not back online, process 498 goes back to Block 1410 to continue checking whether it is back online. If the path becomes online, process 498 removes the path from the bad path list (Block 1412) then goes back to Block 1402 to continue monitoring.

Figure 15:
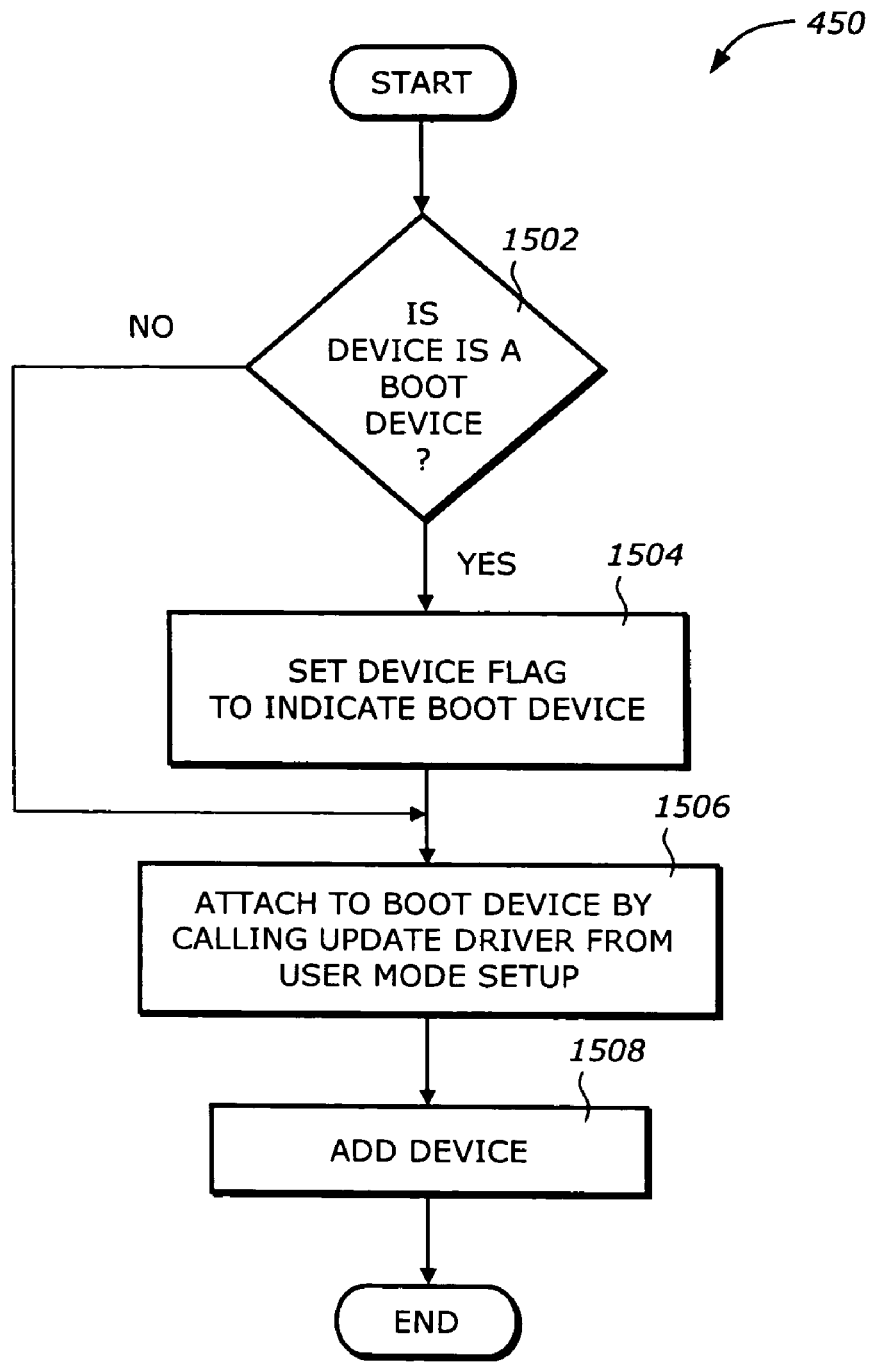
FIG. 15 is a flowchart illustrating the process "add device" 450 (FIG. 4) which handles initialization and creation of device objects.

FIG. 15 is a flowchart illustrating the process "add device" 450 (FIG. 4) which handles initialization and creation of device objects. Upon Start, process 450 detect from user input whether the device to be added is a boot device (block 1502). If it is, process 450 sets a flag to indicate that the device is a boot device (block 1504) then continues at block 1506. If it is not a boot device, process 450 goes directly to block 1506. At block 1506, process 450 attaches the device by calling Update Driver from the user mode setup. Process 450 adds the device (block 1508) then terminates.

Figure 16:
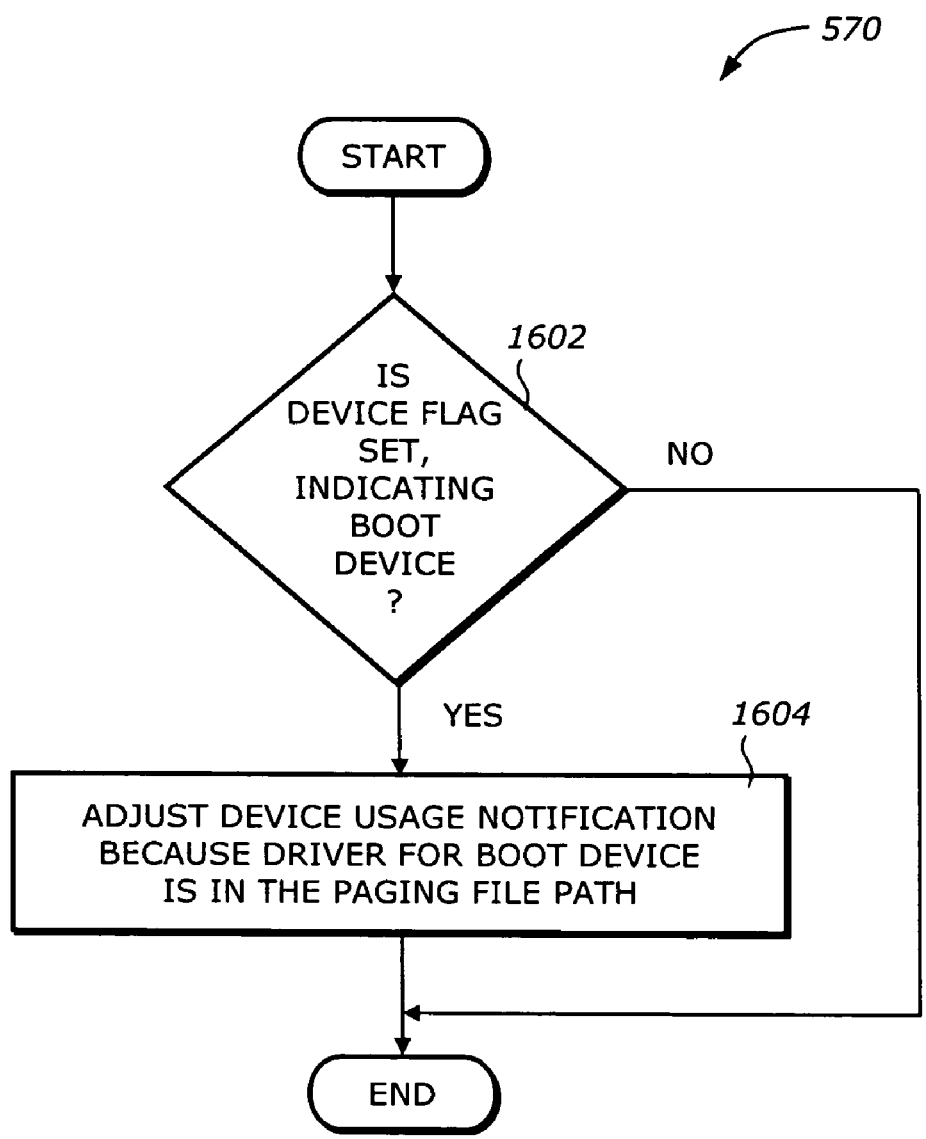
FIG. 16 is a flowchart illustrating the process 570 (FIG. 5) for handling device usage notification.

FIG. 16 is a flowchart illustrating the process 570 (FIG. 5) for handling device usage notification. Upon Start, process 570 checks whether the flag associated with the device is set (block 1602). If the flag is set, this indicates that the device is a boot device. If the flag is set, process 570 adjusts the device usage notification since the driver for the boot device is in the paging file path (block 1604), then terminates. Note that, the driver for the boot device must handle the device usage notification function because the boot device can contain a paging file, dump file, or hibernation file. If the flag is not set, process 570 terminates without doing anything, since the driver for the non-boot device is not in the paging file path.

There are three main situations in which a device is removed (i.e., uninstalled):

1. all the paths allowing access to the device have failed;
2. the resources are being rebalanced; or
3. the low-level driver corresponding to the device is being uninstalled.

To rebalance the resources (situation 2), the universal multi-path driver removes all attached devices associated with each low-level driver that is not a boot device driver, flushes the corresponding I/O queue if it is not already empty, then adds the devices back. During a resource rebalance, the boot device object is not deleted, the associated I/O queue is not flushed, and the reference to the boot device object is kept to ensure that the boot device is accessible.

In one embodiment of the invention, for safety reasons, the boot device can only be uninstalled by shutting down the system.

Figure 17:
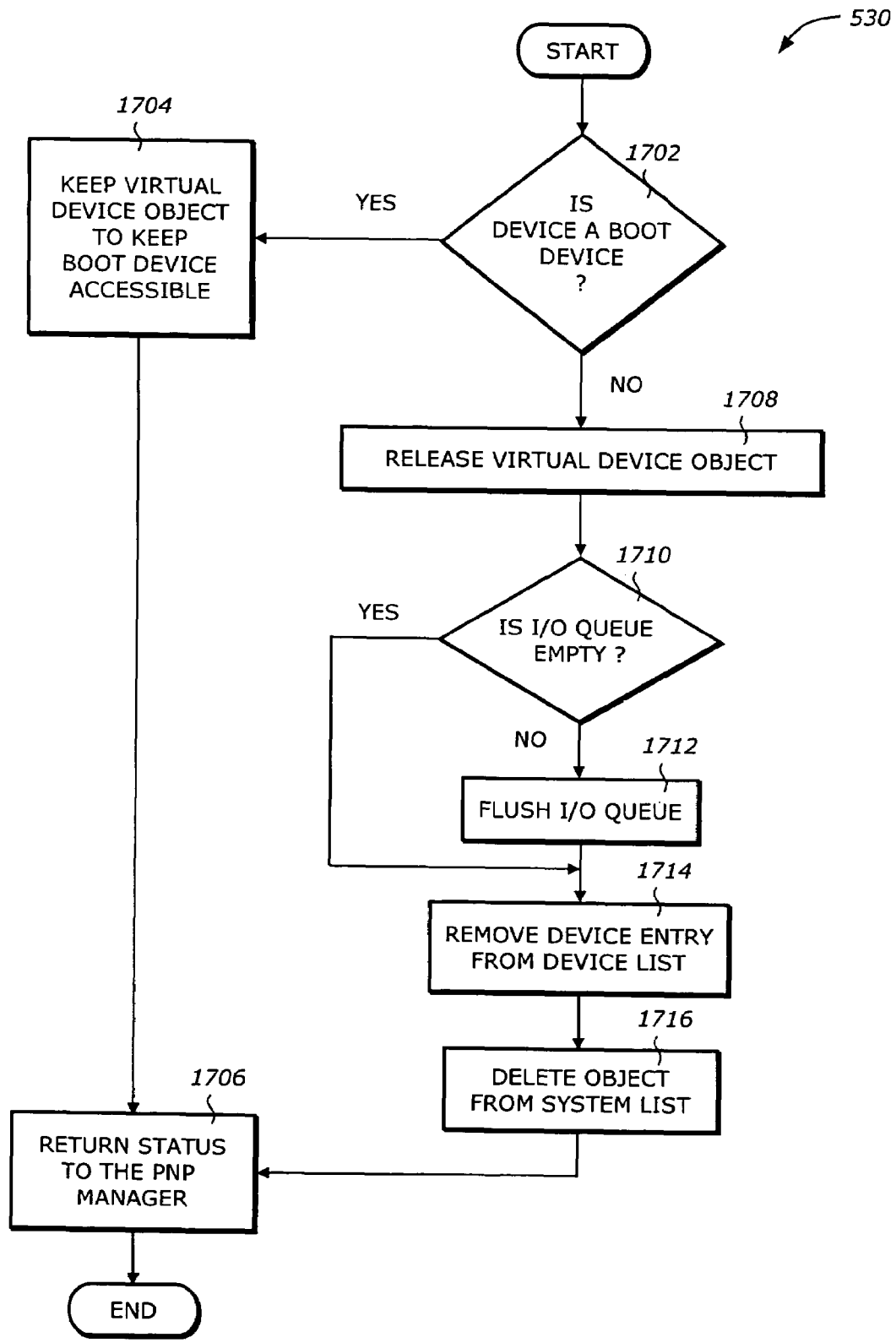
FIG. 17 is a flowchart illustrating the process 530 (FIG. 5) of removing (i.e., uninstalling) a device upon receiving a minor IRP requesting such action.

FIG. 17 is a flowchart illustrating the process 530 (FIG. 5) of removing (i.e., uninstalling) a device upon receiving a minor IRP requesting such action. Upon Start, process 530 checks whether the device to be removed is a boot device (block 1702). If the device is a boot device, process 530 keeps the virtual device object that references the boot device so that the boot device remains accessible (block 1704), then return the status to the Plug-and-Play manager 214 (block 1706). If the device is not a boot device, process 530 releases the virtual device object that references the device to unlock the device (block 1708). Process 530 checks whether the I/O queue is empty (block 1710). If the I/O queue is not empty, process 530 flushes the I/O queue (block 1712) then deletes the object that references the device from the device list (block 1714) and from the system list (block 1716). If the I/O queue is empty, process 530 deletes the object from the device list (block 1714) and from the system list (block 1716) without flushing the I/O queue. Next, process 530 returns a status to the PnP manager 214 (block 1706), then terminates.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   monitoring via a universal multipath driver (UMD) a first path to one of a plurality of virtual device objects, the virtual device objects being created by the UMD and corresponding to a plurality of functional device objects, the functional device objects being created by a plurality of lower level drivers and corresponding to a plurality of real physical devices having M device types including an external boot device, the UMD being a functional driver of each of the functional device objects, the lower level drivers controlling the real physical devices;
   detecting via the UMD a failure of the first path to a first virtual device object corresponding to a first real physical device; and
   performing via the UMD one of failover and failback for the first real physical device.

2. The method of claim 1 wherein the first real physical device is a disk device and wherein performing failover comprises:
   determining if an I/O request has failed on the first path;
   if the I/O request has failed,
      determining if the first path has failed,
      if the first path has failed,
         determining if the first teal physical device is a cluster disk;
         determining if there is an alternate path to the real physical device;
         if there is an alternate path, resending the I/O request through the alternate path.

3. The method of claim 2 wherein the first real physical device is a disk device and wherein performing failover further comprises:
   if the first path has failed and if there is no alternate path, returning an error status.

4. The method of claim 1 wherein the first real physical device is a disk device and wherein performing failover further comprises:
   if the TI/O request has not failed,
   making a buffer queue available for a next T/O request; and
   returning a success status.

5. The method of claim 1 wherein the first real physical device is a disk device and wherein performing failover further comprises:
   if the I/O request has failed and if the first path has not failed,
      resending the I/O request through the first path; and
      returning a success status.

6. The method of claim 1 wherein the first real physical device is a disk device and wherein performing failback comprises:
   determining if a bad path list is empty;
   if the bad path list is not empty,
      determining if the first path has been completely removed;
      if the first path has not been completely removed,
         determining if the first path is back on line;
         if the first path is back on line,
            removing the first path from the bad path list.

7. The method of claim 1 wherein the first real physical device is a tape device and wherein performing failover comprises:
   determining if there is a reservation conflict for a current path;
   if there is a reservation conflict for the current path
      determining if the reservation conflict is due to a failure on a previous path;
      if the reservation conflict is due to a failure on a previous path,
         breaking a reservation on the current path; and
         resending I/O requests through the current path.

8. The method of claim 7 further comprising:
   if there is a reservation conflict for the current path and if the reservation conflict is not due to a failure on a previous path,
   determining if there is an alternate path to the real physical device;
   if there is no alternate path,
      breaking a reservation on the current path; and
      resending I/O requests through the current path;
   if there is an alternate path,
      disabling the current path; and
      resending I/O requests through the alternate path.

9. The method of claim 7 further comprising:
   if there is no reservation conflict for a current path,
   determining if the current path has failed;
   if the current path has failed,
      determining if there is an alternate path to the real physical device;
      if there is an alternate path to the real physical device,
         adding the current path to a bad path list; and
         resending I/O requests on the alternate path;
      if there is no alternate path to the real physical device,
         returning an error status.

10. The method of claim 1 wherein the first real physical device is a tape device and wherein performing failback comprises:
    determining if a bad path list is empty;
    if the bad path list is not empty,
       determining if the first path has been completely removed;
       if the first path has not been completely removed,
          determining if the first path is back on line;
          if the first path is back on line,
             removing the first path from the bad path list.

11. The method of claim 10 wherein performing failback further comprises:
    if the bad path list is not empty,
       determining if the first path is reserved;
       if the first path is reserved, adding the first path to an active path list.

12. The method of claim 1 wherein the M device types include at least two of a disk device, a tape device, a redundant army of inexpensive disks (RAID) subsystem, and a tape library.

13. An article of manufacture comprising:
    a machine-accessible storage medium including data that, when accessed by a machine, cause the machine to perform operations comprising:

monitoring via a universal multipath driver (UMD) a first path to one of a plurality of virtual device objects, the virtual device objects being created by the UMD and corresponding to a plurality of functional device objects, the functional device objects being created by a plurality of lower level drivers and corresponding to a plurality of real physical devices having M device types including an external boot device, the UMD being a functional driver of each of the functional device objects, the lower level drivers controlling the real physical devices;

detecting via the UMD a failure of the first path to a first virtual device object corresponding to a first real physical device; and performing via the UMD one of failover and failback for the first real physical device.

14. The article of manufacture of claim 13 wherein the first real physical device is a disk device and wherein the data causing the machine to perform the operation of performing failover comprise data that, when accessed by the machine, cause the machine to perform operations comprising:

determining if an I/O request has failed on the first path;
if the I/O request has failed,
determining if the first path has failed,
if the first path has failed,
determining if the first real physical device is a cluster disk;
determining if there is an alternate path to the real physical device;
if there is an alternate path, resending the T/O request through the alternate path.

15. The article of manufacture of claim 14 wherein the first real physical device is a disk device and wherein the data causing the machine to perform the operation of performing failover further comprise data that, when accessed by the machine, cause the machine to perform operations comprising:

if the first path has failed and if there is no alternate path, returning an error status.

16. The article of manufacture of claim 13 wherein the first real physical device is a disk device and wherein the data causing the machine to perform the operation of performing failover further comprise data that, when accessed by the machine, cause the machine to perform operations comprising:

if the I/O request has not failed,
making a buffer queue available for a next I/O request; and
returning a success status.

17. The article of manufacture of claim 13 wherein the first real physical device is a disk device and wherein the data causing the machine to perform the operation of performing failover further comprise data that, when accessed by the machine, cause the machine to perform operations comprising:

if the I/O request has failed and if the first path has not failed,
resending the I/O request through the first path; and
returning a success status.

18. The article of manufacture of claim 13 wherein the first real physical device is a disk device and wherein the data causing the machine to perform the operation of performing failback comprise data that when accessed by the machine, cause the machine to perform operations comprising:

determining if a bad path list is empty;
if the bad path list is not empty,
determining if the first path has been completely removed;
if the first path has not been completely removed,
determining if the first path is back on line;
if the first path is back on line,
removing the first path from the bad path list.

19. The article of manufacture of claim 13 wherein the first real physical device is a tape device and wherein the data causing the machine to perform the operation of performing failover comprise data that, when accessed by the machine, cause the machine to perform operations comprising:

determining if there is a reservation conflict for a current path;
if there is a reservation conflict for the current path,
determining if the reservation conflict is due to a failure on a previous path;
if the reservation conflict is due to a failure on a previous path,
breaking a reservation on the current path; and
resending I/O requests through the current path.

20. The article of manufacture of claim 19 wherein the data causing the machine to perform the operation of performing failover comprise data that, when accessed by the machine, cause the machine to perform operations comprising:

if there is a reservation conflict for the current path and if the reservation conflict is not due to a failure on a previous path,
determining if there is an alternate path to the real physical device;
if there is no alternate path,
breaking a reservation on the current path; and
resending I/O requests through the current path;
if there is an alternate path,
disabling the current path; and
resending I/O requests through the alternate path.

21. The article of manufacture of claim 19 wherein the data causing the machine to perform the operation of performing failover comprise data that, when accessed by the machine, cause the machine to perform operations comprising:

if there is no reservation conflict for a current path,
determining if the current path has failed;
if the current path has failed;
determining if there is an alternate path to the real physical device;
if there is an alternate path to the real physical device,
adding the current path to a bad path list; and
resending I/O requests on the alternate path;
if there is no alternate path to the real physical device,
returning an error status.

22. The article of manufacture of claim 13 wherein the first real physical device is a tape device and wherein the data causing the machine to perform the operation of performing failback comprise data that, when accessed by the machine, cause the machine to perform operations comprising:

determining if a bad path list is empty;
if the bad path list is not empty,
determining if the first path has been completely removed;
if the first path has not been completely removed,
determining if the first path is back on line;
if the first path is back on line,
removing the first path from the bad path list.

23. The article of manufacture of claim 22 wherein the data causing the machine to perform the operation of performing failback further comprise data that, when accessed by the machine, cause the machine to perform operations comprising:

if the bad path list is not empty,
determining if the first path is reserved; and if the first path is reserved, adding the first path to an active path list.

24. The article of manufacture of claim 13 wherein the M device types include at least two of a disk device, a tape device, a redundant array of inexpensive disks (RAID) subsystem, and a tape library.

25. A system comprising:
a processor;
a plurality of devices having M device types coupled to the processor via a plurality of adapters; and
a memory coupled to the processor, the memory containing program code that, when executed by the processor, causes the processor to:
monitor via a universal multipath driver (UMD) a first path to one of a plurality of virtual device objects, the virtual device objects being created by the UMD and corresponding to a plurality of functional device objects, the functional device objects being created by a plurality of lower level drivers and corresponding to a plurality of real physical devices having M device types including an external boot device, the UMD being a functional driver of each of the functional device objects, the lower level drivers controlling the real physical devices;
detect via the UMD a failure of the first path to a first virtual device object corresponding to a first real physical device; and
perform via the UMD one of failover and failback for the first real physical device.

26. The system of claim 25 wherein the first real physical device is a disk device and wherein the program code causing the processor to perform failover comprises program code that, when executed by the processor, causes the processor to:
determine if an I/O request has failed on the first path;
if the I/O request has failed,
determine if the first path has failed,
if the first path has failed,
determine if the first real physical device is a cluster disk;
determine if there is an alternate path to the real physical device;
if there is an alternate path, resend the I/O request through the alternate path.

27. The system of claim 26 wherein the first real physical device is a disk device and wherein the program code causing the processor to perform failover further comprises program code that, when executed by the processor, causes the processor to:
if the first path has failed and if there is no alternate path, return an error status.

28. The system of claim 25 wherein the first real physical device is a disk device and wherein the program code causing the processor to perform failover further comprises program code that, when executed by the processor, causes the processor to:
if the I/O request has not failed,
make a buffer queue available for a next I/O request; and
return a success status.

29. The system of claim 25 wherein the first real physical device is a disk device and wherein the program code causing the processor to perform failover further comprises program code that, when executed by the processor, causes the processor to:
if the I/O request has failed and if the first path has not failed,
resend the I/O request trough the first path; and
return a success status.

30. The system of claim 25 wherein the first real physical device is a disk device and wherein the program code causing the processor to perform failback comprises program code that, when executed by a processor, causes the processor to:
determine if a bad path list is empty;
if the bad path list is not empty,
determine if the first path has been completely removed;
if the first path has not been completely removed,
determine if the first path is back on line;
if the first path is back on line,
remove the first path from the bad path list.

31. The system of claim 25 wherein the first real physical device is a tape device and wherein the program code causing the processor to perform failover comprises program code that, when executed by the processor, causes the processor to:
determine if there is a reservation conflict for a current path;
if there is a reservation conflict for the current path,
determine if the reservation conflict is due to a failure on a previous path;
if the reservation conflict is due to a failure on a previous path,
break a reservation on the current path; and
resend I/O requests through the current path.

32. The system of claim 31 wherein the program code causing the processor to perform failover comprises program code that, when executed by the processor, causes the processor to:
if there is a reservation conflict for the current path and if the reservation conflict is not due to a failure on a previous path,
determine if there is an alternate path to the real physical device;
if there is no alternate path,
break a reservation on the current path; and
resend I/O requests through the current path;
if there is an alternate path,
disable the current path; and
resend I/O requests through the alternate path.

33. The system of claim 31 wherein the program code causing the processor to perform failover comprises program code that, when executed by a processor, causes the processor to:
if there is no reservation conflict for a current path,
determine if the current path has failed;
if the current path has failed,
determine if there is an alternate path to the real physical device;
if there is an alternate path to the real physical device,
add the current path to a bad path list; and
resend I/O requests on the alternate path;
if there is no alternate path to the real physical device,
return an error status.

34. The system of claim 25 wherein the first real physical device is a tape device and wherein the program code causing the processor to perform failback comprises program code that, when executed by a processor, causes the processor to:
determine if a bad path list is empty;
if the bad path list is not empty,
determine if the first path has been completely removed;
if the first path has not been completely removed, determine if the first path is back on line;
if the first path is back on line,
remove the first path from the bad path list.

35. The system of claim 34 wherein the program code causing the processor to perform failback further comprises program code that, when executed by a processor, causes the processor to:
if the bad path list is not empty,
determine if the first path is reserved; and
if the first path is reserved, add the first path to an active path list.

36. The system of claim 25 wherein the M device types include at least two of a disk device, a tape device, a redundant array of inexpensive disks (RAID) subsystem, and a tape library.

* * * * *